US011234436B2

(12) United States Patent
Sikuljak et al.

(10) Patent No.: US 11,234,436 B2
(45) Date of Patent: Feb. 1, 2022

(54) METHOD FOR CONTROLLING NON-CROP PESTS

(71) Applicant: BASF Agrochemical Products B.V., EA Arnhem (NL)

(72) Inventors: Tatjana Sikuljak, Mannheim (DE); Robert Reinhard, Limburgerhof (DE); Clark Klein, Pittsboro, NC (US); Kenneth Scott Brown, Wake Apex, NC (US); Christy Jones, Research Triangle Park, NC (US)

(73) Assignee: BASF AGROCHEMICAL PRODUCTS B.V., Arnhem (NL)

( * ) Notice: Subject to any disclaimer, the term of this patent is extended or adjusted under 35 U.S.C. 154(b) by 0 days.

(21) Appl. No.: 15/566,341

(22) PCT Filed: Apr. 14, 2016

(86) PCT No.: PCT/EP2016/058286
§ 371 (c)(1),
(2) Date: Oct. 13, 2017

(87) PCT Pub. No.: WO2016/166252
PCT Pub. Date: Oct. 20, 2016

(65) Prior Publication Data
US 2018/0139960 A1 May 24, 2018

Related U.S. Application Data

(60) Provisional application No. 62/148,775, filed on Apr. 17, 2015.

(51) Int. Cl.
*A01N 37/46* (2006.01)
*A01N 25/34* (2006.01)
*A01N 25/08* (2006.01)
*A01N 37/22* (2006.01)

(52) U.S. Cl.
CPC ............ *A01N 37/46* (2013.01); *A01N 25/08* (2013.01); *A01N 25/34* (2013.01); *A01N 37/22* (2013.01)

(58) Field of Classification Search
None
See application file for complete search history.

(56) References Cited

U.S. PATENT DOCUMENTS

| 6,645,949 | B1 * | 11/2003 | Nigg | A01N 55/00 424/657 |
|---|---|---|---|---|
| 6,908,945 | B2 | 6/2005 | Mori | |
| 10,791,734 | B2 * | 10/2020 | Sikuljak | A01N 43/90 |
| 2002/0042439 | A1 * | 4/2002 | Zangiacomi | A01N 43/56 514/404 |
| 2010/0322990 | A1 * | 12/2010 | Burke | A01N 25/04 424/405 |
| 2011/0201687 | A1 | 8/2011 | Kobayashi et al. | |

FOREIGN PATENT DOCUMENTS

| EP | 2319830 A1 * | 5/2011 | ............ A01N 37/46 |
|---|---|---|---|
| JP | 2011-157296 A | 8/2011 | |
| JP | 2011157294 A | 8/2011 | |
| JP | 2011157295 A | 8/2011 | |
| JP | 2013166707 A | 8/2013 | |
| WO | 2005064072 A2 | 7/2005 | |
| WO | 2005073165 A1 | 8/2005 | |
| WO | 2006013896 A1 | 2/2006 | |
| WO | WO-2006088653 A2 * | 8/2006 | ............ A01N 43/36 |
| WO | 2006129714 A1 | 12/2006 | |
| WO | 2007006670 A1 | 1/2007 | |
| WO | 2007013150 A1 | 2/2007 | |
| WO | 2007020986 A1 | 2/2007 | |
| WO | 2007115644 A1 | 10/2007 | |
| WO | 2007144401 A2 | 12/2007 | |
| WO | 2007149134 A1 | 12/2007 | |
| WO | 2008126922 A1 | 10/2008 | |
| WO | 2008142103 A1 | 11/2008 | |
| WO | 2008151984 A1 | 12/2008 | |
| WO | 2009023721 A1 | 2/2009 | |
| WO | 2009121580 A2 | 10/2009 | |
| WO | 2010012671 A2 | 2/2010 | |
| WO | 2010018714 A1 | 2/2010 | |
| WO | 2010018857 A1 | 2/2010 | |
| WO | 2010108616 A1 | 9/2010 | |
| WO | 2010133098 A1 | 11/2010 | |
| WO | 2011006946 A2 | 1/2011 | |
| WO | WO-2011104468 A1 * | 9/2011 | ............ A01N 25/10 |
| WO | 2011128380 A1 | 10/2011 | |
| WO | 2011149899 A1 | 12/2011 | |
| WO | 2012038460 A2 | 3/2012 | |
| WO | 2012069266 A1 | 5/2012 | |

(Continued)

OTHER PUBLICATIONS

English Language Translation of WO 2011/104468 A1 (Year: 2011).*
International Search Report issued in International Application No. PCT/EP2016/058286 dated Jun. 6, 2016, 3 pages.
Written Opinion of the International Search Authority issued in International Application No. PCT/EP2016/058286 dated Jun. 6, 2016, 8 pages.
F.T. Bullen, "Locusts and Grasshoppers as Pests of Crops and Pasture—A Preliminary Economic Approach", Journal of Applied Ecology, vol. 3, Issue 1, May 1, 1966, p. 147-168.

(Continued)

*Primary Examiner* — Dominic Lazaro

(74) *Attorney, Agent, or Firm* — Marshall, Gerstein & Borun LLP

(57) ABSTRACT

Methods and uses for controlling non-crop pests (especially of the orders Blattodea, Diptera, Hemiptera, Hymenoptera, Isoptera, Orthoptera) and/or populations of social insects and non-social solitary or gregarious insects, especially ants, wasps, termites and cockroaches, with a carboxamide compound and its mixtures, and compositions comprising it, are disclosed.

26 Claims, No Drawings

(56) References Cited

FOREIGN PATENT DOCUMENTS

| WO | 2012092115 A1 | 7/2012 |
| WO | 2013000907 A2 | 1/2013 |
| WO | 2013024009 A1 | 2/2013 |
| WO | 2013024010 A1 | 2/2013 |
| WO | 2013117521 A1 | 8/2013 |
| WO | 2015/055757 A1 | 4/2015 |
| WO | 2015055752 A1 | 4/2015 |
| WO | 2015055755 A1 | 4/2015 |
| WO | 2016/142456 A1 | 9/2016 |

OTHER PUBLICATIONS

Nakao, et al., "Minireview: Mode of action of meta-diamide insecticides", Pesticide Biochemistry and Physiology, vol. 121, Sep. 30, 2014, pp. 39-46.

Sharma, et al., "Insecticidal value of castor (Ricinus cummunis) against termites", International Biodeterioration, vol. 27, Issue 3, Jan. 1, 1991, pp. 249-254.

Walton, et al., "Pest Status Review Series—Land Protection", Locusts in Queensland, Feb. 2003, pp. 1-45.

Umeh, et al., "Soil Pests of Groundnut in West Africa-Species Diversity, Damage and Estimation of Yield Losses", International Journal of Tropical Insect Science, vol. 19, Issue 2-3, Sep. 1, 1999, pp. 131-140.

European Patent Application No. 16716248.6, Communication Pursuant to Article 94(3) EPC, dated Mar. 23, 2021.

\* cited by examiner

METHOD FOR CONTROLLING NON-CROP PESTS

CROSS-REFERENCE TO RELATED APPLICATIONS

This application is a U.S. National Phase Application of PCT/EP2016/058286, filed Apr. 14, 2016, which claims the benefit of priority to U.S. Provisional Application No. 62/148,775, filed Apr. 17, 2015, the contents of which are hereby expressly incorporated by reference in their entirety.

The present invention relates to new uses and new application methods of a pesticidal carboxamide compound.

The invention relates to methods and the use of the carboxamide compound of formula (I) alone or in combination with one or more other pesticidal actives in mixtures, especially for non-agronomic applications, against non-crop pests such ants, flies, wasps, termites, bed bugs, cockroaches and other pests, especially household pests and stored product pests.

Pesticides, e.g. insecticides, are often used in crop applications. However, there is also a need for efficient pesticides, e.g. insecticides, in non-crop applications, e.g. in the household or for (professional) pest management in urban facilities and rural areas, e.g. in and around farm premises and animal housing, storage or the like.

In a first aspect, the invention relates to a method for controlling non-crop pests, comprising contacting the pests or their food supply, habitat, breeding grounds or their locus with at least one pesticidally active carboxamide compound I selected from i) compound i) of formula (I)

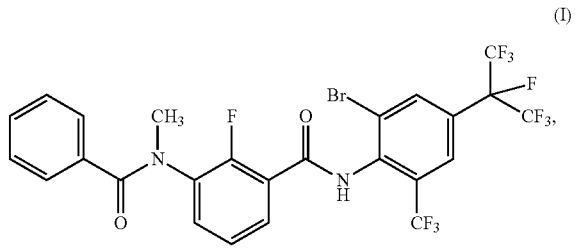 [SMILES: CN(C(=O)c1ccccc1)c1cccc(C(=O)Nc2c(Br)cc(C(F)(C(F)(F)F)C(F)(F)F)cc2C(F)(F)F)c1F]

ii) compound ii) of formula (Ia)

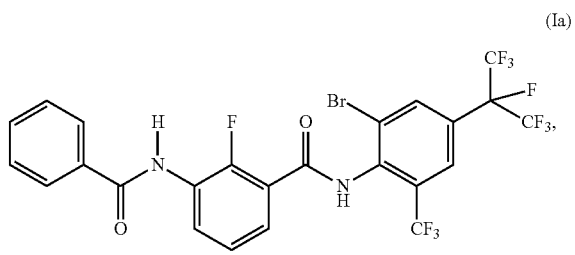 [SMILES: O=C(Nc1cccc(C(=O)Nc2c(Br)cc(C(F)(C(F)(F)F)C(F)(F)F)cc2C(F)(F)F)c1F)c1ccccc1]

or iii) mixtures comprising compounds i) and ii).

The terms "compound i) of formula (I)" and "compound ii) of formula (Ia)", "mixture comprising compounds i) and ii)", and ""mixtures comprising compounds i) and ii)" are understood to include any stereoisomer, salt or tautomer thereof as well as any polymorphic crystalline form, co-crystal or a solvate.

The terms "mixture comprising compounds i) and ii)" and "mixtures comprising compounds i) and ii)" have the same meaning as the term "mixture comprising compounds i) of formula (I) and compound ii) of formula (Ia)."

Accordingly, the present invention also relates to methods and the use of a compound I as defined herein, or a composition comprising it, for controlling or combating non-crop pests.

Further, the present invention also relates to a method for controlling a population of social insects, which method comprises applying a compound I as defined herein, or a composition comprising it. The social insects are preferably termites, ants and wasps. The invention also relates to the use of a compound I as defined herein, or a composition comprising it, for controlling a population of social insects.

Furthermore, the present invention also relates to a method for controlling a population of non-social solitary or gregarious insects, which method comprises applying a compound I as defined herein, or a composition comprising it. The non-social solitary or gregarious insects are preferably cockroaches or bed bugs. The invention also relates to the use of a compound I as defined herein, or a composition comprising it, for controlling a population of social insects.

Compound I is preferably compound i) of formula (I).

Compound I

Carboxamide derivatives showing generally pesticidal activity have been described previously. WO200573165 and WO2010018714 describe carboxamide compounds, their preparation and their use as pest control agents. WO2007013150, JP2011-157294, JP2011-157295 and JP2011-157296 describe mixtures of carboxamides with other active ingredients.

Preparation of the carboxamide compound I, preferably compound i) of formula (Ia) can further be accomplished according to standard methods of organic chemistry, e.g. by the methods or working examples described in WO 2010/018857 without being limited to the routes given therein.

The carboxamide compound i) of formula (I), which has been provisionally approved under the common name broflanilide, has been described in combination with fungicidal active compounds in PCT/EP2014/072189 or with insecticidal active compounds in PCT/EP2014/072183.

However, although the carboxamide compound I, preferably compound i) of formula (I) itself and its combined application with other insecticides is known to have shown activity against certain crop damaging insect pests, the carboxamide compound I, preferably compound i) of formula (I), and some of its selected mixtures with pesticidally active compounds II, has not yet been described for solving discussed problems as mentioned above, especially in showing surprisingly synergistic effects in combination with selected pesticides in the control of non-crop pests.

The carboxamide compound of formula (I), as well as the interchangeably used terms "compound for methods according to the (present) invention", "compound according to the (present) invention", "compound i) of formula (I)", "compound ii) of formula (Ia)", or "mixture comprising compounds i) and ii)" is applied in methods and uses according to the present invention.

The term "composition(s) according to the invention" or "composition(s) of the present invention" encompasses composition(s) comprising at least the carboxamide I, preferably compound i) of formula (I) or mixtures of the compound I, preferably compound i) of formula (I) with other pesticidally active compound(s) II for being used and/or applied in methods according to the invention as defined above.

The compounds of the present invention may be amorphous or may exist in one ore more different crystalline states (polymorphs) which may have different macroscopic properties such as stability or show different biological properties such as activities. The present invention includes both amorphous and crystalline compounds I, preferably compound i) of formula (I), their enantiomers or diastereomers, mixtures of different crystalline states of the respective compound I, preferably compound i) of formula (I), its enantiomers or diastereomers, as well as amorphous or crystalline salts thereof.

The term "co-crystal" denotes a complex of the compounds according to the invention or a stereoisomer, salt, tautomer or N-oxide thereof, with one or more other molecules (preferably one molecule type), wherein usually the ratio of the compound according to the invention and the other molecule is a stoichiometric ratio.

The term "solvate" denotes a co-complex of the compounds according to the invention, or a stereoisomer, salt, tautomer or N-oxide thereof, with solvent molecules. The solvent is usually liquid. Examples of solvents are methanol, ethanol, toluol, xylol. A preferred solvent which forms solvates is water, which solvates are referred to as "hydrates". A solvate or hydrate is usually characterized by the presence of a fixed number of n molecules solvent per m molecules compound according to the invention.

Methods for Controlling or Combating Non-Crop Pests

The compound i) of formula (I), the compound ii) of formula (Ia), and the mixture comprising compounds i) and ii) as defined herein, or the compositions comprising them, are used for combating or controlling non-crop pests.

The compound I, preferably compound i) of formula (I) as defined herein, or the compositions comprising it, is used for the prevention of infestation by non-crop pests.

The invention also relates to compositions containing compound I, preferably compound i) of formula (I) alone or in combination with other pesticidal actives in pesticidally effective amounts for controlling non-crop pests.

The invention further relates to the use of compound I, preferably compound i) of formula (I) for the protection of non-living organic materials against non-crop pests.

Typical problems arising with the use of presently available non-crop pest control agents such as pyrethroids are e.g. resistance of pests or unfavorable environmental or toxicological properties. Another problem encountered concerns the need to have available non-crop pest control agents which are effective against a broad spectrum of non-crop pests. Accordingly, there is a need to provide new and improved non-crop pest control agents, or suitable combinations of pesticidal active ingredients that overcome these problems.

It is therefore an object of the present invention to provide new non-crop pest control agents, or suitable combinations of pesticidal active ingredients, which preferably exhibiting an enhanced pesticidal spectrum of action.

We have found that these objects are achieved by use of the compound I, preferably compound i) of formula (I) and compositions comprising it alone or in combination with other pesticidal actives.

Non-crop pests are pests of the classes Chilopoda and Diplopoda and of the orders Isoptera, Diptera, *Blattaria* (Blattodea), Dermaptera, Hemiptera, Hymenoptera, Orthoptera, Siphonaptera, Thysanura, Phthiraptera, Araneida, Parasitiformes and Acaridida.

The compounds I, preferably compound i) of the formula (I) are especially suitable for efficiently combating the following pests:

centipedes (Chilopoda), e.g. *Scutigera coleoptrata*,
millipedes (Diplopoda), e.g. *Narceus* spp.,
spiders (Araneida), e.g. *Latrodectus mactans*, and *Loxosceles reclusa*,
scabies (Acaridida): e.g. *sarcoptes* sp,
ticks and parasitic mites (Parasitiformes): ticks (Ixodida), e.g. *Ixodes scapularis, Ixodes holocyclus, Ixodes pacificus, Rhiphicephalus sanguineus, Dermacentor andersoni, Dermacentor variabilis, Amblyomma americanum, Ambryomma maculatum, Orni-thodorus hermsi, Ornithodorus turicata* and parasitic mites (Mesostigmata), e.g. *Orni-thonyssus bacoti* and *Dermanyssus gallinae*,
termites (Isoptera), e.g. *Calotermes flavicollis, Leucotermes flavipes, Heterotermes aureus, Reticulitermes flavipes, Reticulitermes virginicus, Reticulitermes lucifugus, Termes natalensis*, and *Coptotermes formosanus*,
cockroaches (*Blattaria*-Blattodea), e.g. *Blattella germanica, Blattella asahinae, Peri-planeta americana, Periplaneta japonica, Periplaneta brunnea, Periplaneta fuligginosa, Peri-planeta australasiae*, and *Blatta orientalis*,
flies (Diptera), e.g. *Aedes aegypti, Aedes albopictus, Aedes vexans, Anas-trepha ludens, Anopheles maculipennis, Anopheles crucians, Anopheles albimanus, Anopheles gambiae, Anopheles freeborni, Anopheles leucosphyrus, Anopheles minimus, Anopheles quadrimaculatus, Calliphora vicina, Chrysomya bezziana, Chrysomya hominivorax, Chrysomya macellaria, Chrysops discalis, Chrysops silacea, Chrysops atlanticus, Cochliomyia hominivorax, Cordylobia anthropophaga, Culicoides furens, Culex pipiens, Culex nigripalpus, Culex quinquefasciatus, Culex tarsalis, Culiseta inor-nata, Culiseta melanura, Dermatobia hominis, Fannia canicularis, Gasterophilus intes-tinalis, Glossina morsitans, Glossina palpalis, Glossina fuscipes, Glossina tachinoides, Haematobia irritans, Haplodiplosis equestris, Hippelates* spp., *Hypoderma lineata, Lep-toconops torrens, Lucilia caprina, Lucilia cuprina, Lucilia se cata, Lycoria pectoralis, Mansonia* spp., *Musca domestica, Muscina stabulans, Oestrus ovis, Phlebotomus ar-gentipes, Psorophora columbiae, Psorophora discolor, Pro simulium mixtum, Sarcophaga haemorrhoidalis, Sarcophaga* sp., *Simulium vittatum, Stomoxys calcitrans, Ta-banus bovinus, Tabanus atratus, Tabanus lineola*, and *Tabanus similis*,
Earwigs (Dermaptera), e.g. *forficula auricularia*,
true bugs (Hemiptera), e.g. *Cimex lectularius, Cimex hemipterus, Reduvius senilis, Triatoma* spp., *Rhodnius prolixus*, and *Arilus critatus*,
ants, bees, wasps, sawflies (Hymenoptera), e.g. *Crematogaster* spp., *Hoplocampa minuta, Hoplocampa testudinea, Monomo um pharaonis, Solenopsis geminata, Sole-nopsis invicta, Solenopsis richteri, Solenopsis xyloni, Pogonomyrmex barbatus, Pogo-nomyrmex californicus, Dasymutilla occidentalis, Bombus* spp. *Vespula squamosa, Paravespula vulgaris, Paravespula pennsylvanica, Paravespula germanica, Dolichovespula maculata, Vespa crabro, Polistes rubiginosa, Camponotus floridanus*, and *Li-nepithema humile*,
crickets, grasshoppers, locusts (Orthoptera), e.g. *Acheta domestica, Gryllotalpa gryllo-talpa, Locusta migratoria, Melanoplus bivittatus, Melanoplus femurrubrum, Melanoplus mexicanus, Melanoplus sanguinipes, Melanoplus spretus, Nomadacris septemfasciata, Schistocerca americana, Schistocerca gregaria, Dociostaurus*

*maroccanus, Tachycines asynamorus, Oedaleus senegalensis, Zonozerus variegatus, Hieroglyphus daganensis, Kraussaria angulifera, Calliptamus italicus, Cho oicetes terminifera*, and *Locustana pardaliria*, fleas (Siphonaptera), e.g. *Ctenocephalides felis, Ctenocephalides canis, Xenopsylla cheopis, Pulex irritans, Tunga penetrans*, and *Nosopsyllus fasciatus,* silverfish, firebrat (Thysanura), e.g. *Lepisma saccharina* and *Thermobia domestica,* lice (Phthiraptera), e.g. *Pediculus humanus capitis, Pediculus humanus corporis, Pthi-rus pubis, Haematopinus eurystemus, Haematopinus suis, Linognathus vituli, Bovlcola bovis, Menopon gallinae, Menacanthus stramineus* and *Solenopotes capillatus*. The hydrazine derivatives of formula (I) which can be used according to the invention are known from and can be prepared according to preparation methods described or referenced in EP-A 604 798. This document relates to plant protection in the agricultural field and discloses the insecticidal and acaricidal activity of compounds I, preferably compound i) of formula I and other compounds against crop pests of the Coleoptera, Lepidoptera and Acarina orders.

Activity of a compound against pests for plant protection in the agricultural field, that is, against crop pests, does not generally suggest activity of that compound against non-crop pests. Crop pest control always is a part of plant protection and plays a major role in agriculture and for the agricultural market.

Non-crop pest control, on the contrary, e.g. relates to protection of non-living organic materials, private households and/or public buildings (e.g. such as commercial, industrial and governmental premises). For these structures, very often professional applicators are hired for the treatment and for the control and combat of the non-crop pest infestations. Non-crop pest control products are also commonly used for pest management in rural areas, e.g. in and around farm premises, structures and animal housing and for the prevention of infestation by such pests. The differences in requirements for crop/non-crop pest control generally and mainly—beside a possible difference in biochemical targets—emerge from the differences in the food and/or habitat of the pests.

Crop pests like that of the order Homoptera feed on the green parts of the plant by piercing them and sucking the plant liquids. Other crop pests of the Lepidoptera and Coleoptera order feed on the green parts of plants by biting off parts.

On the contrary, non-crop pests do not live on plants and do not or only in rare occasions feed on the green parts of the plant. Non-crop pests e.g. feed on non-living organic materials such as the homes, clothing and the food etc. of human beings and animals but also on electric wires etc. thereby introducing pathogenic germs into the human being's environment and destroying their homes and food. An example is the termite that primarily feeds on cellulose which is the major component of wood and paper products.

The properties of pesticides need to be adapted to their specific use. Systemic pesticides for example that by virtue of their water-solubility are introduced into the plant parts are suitable for controlling piercing-sucking or biting (i.e. crop) pests. However, they cannot generally be expected to show equal activity against non-crop pests who do not feed on the green plant parts but are controlled by mostly water-insoluble pesticides in baiting systems or by direct treatment. In many cases crop pest control pesticides are not suitable for non-crop pest controlling and vice versa. The market insecticides pirimicarb, acephate, pyrimidiven, and pyridaben are examples. They are active against crop insects but show low activity against non-crop pests.

Surprisingly, it has now been found that the compound I of the group of pesticidal carboxamides, namely the carboxamide compound i) of formula (I), exhibit broad spectrum activity against non-crop pests alone, and show synergistic effects in combination with other pesticidal actives.

In one embodiment, the invention relates to a method for controlling non-crop pests, which method comprises applying a compound i) of formula (I).

In another embodiment, the invention relates to a method for controlling non-crop pests, which method comprises applying a compound ii) of formula (Ia).

In still another embodiment the invention relates to a method for controlling non-crop pests, which method comprises applying a mixture comprising compounds i) and ii).

In an embodiment of the invention, in the methods and uses according to the invention, the non-crop pest is selected from flies (Diptera).

In one embodiment, the invention relates to a method for controlling non-crop pest which is selected from flies, which method comprises applying compound i) of formula (I).

In another embodiment, the invention relates to a method for controlling non-crop pest which is selected from flies, which method comprises applying compound ii) of formula (Ia).

In still another embodiment, the invention relates to a method for controlling non-crop pest which is selected from flies, which method comprises applying a mixture comprising compounds i) and ii).

Some examples of non-crop flies are *Anastrepha ludens, Calliphora vicina, Chrysomya bezziana, Chrysomya hominivorax, Chrysomya macellaria, Musca domestica* or *Muscina stabulans.*

In an embodiment of the invention, in the methods and uses according to the invention, the non-crop pest is selected from termites (Isoptera). More preferably, the non-crop pest is selected from: *Calotermes flavicollis, Leucotermes flavipes, Heterotermes aureus, Reticulitermes flavipes, Reticulitermes virginicus, Reticulitermes lucifugus, Termes natalensis*, and *Coptotermes formosanus.*

In one embodiment, the invention relates to a method for controlling non-crop pest which is selected from termites, which method comprises applying a compound i) of formula (I).

In another embodiment, the invention relates to a method for controlling non-crop pest which is selected from termites, which method comprises applying compound ii) of formula (Ia).

In still another embodiment, the invention relates to a method for controlling non-crop pest which is selected from termites, which method comprises applying a mixture comprising compounds i) and ii).

In an embodiment of the invention, in the methods and uses according to the invention, the non-crop pest is selected from ants (Hymenoptera). More preferably, the non-crop pest is selected from: *Crematogaster* spp., *Hoplocampa minuta, Hoplocampa testudinea, Monomo um pharaonis, Solenopsis geminata, Sole-nopsis invicta, Solenopsis richteri, Solenopsis xyloni, Pogonomyrmex barbatus, Pogonomyrmex californicus, Dasymutilla occidentalis, Bombus* spp. *Vespula squamosa, Paravespula vulgaris, Paravespula pennsylvanica, Paravespula germanica, Dolicho-vespula maculata, Vespa crabro, Polistes rubiginosa, Camponotus floridanus*, and *Linepithema humile.*

In one embodiment, the invention relates to a method for controlling non-crop pest which is selected from ants, which method comprises applying a compound i) of formula (I).

In another embodiment, the invention relates to a method for controlling non-crop pest which is selected from ants, which method comprises applying compound ii) of formula (Ia).

In still another embodiment, the invention relates to a method for controlling non-crop pest which is selected from ants, which method comprises applying a mixture comprising compounds i) and ii).

In an embodiment of the invention, in the methods and uses according to the invention, the non-crop pest is selected from crickets, grasshoppers, locusts (Orthoptera). More preferably, the non-crop pest is selected from: *Acheta domestica, Gryllotalpa gryllo-talpa, Locusta migratoria, Melanoplus bivittatus, Melanoplus femurrubrum, Melanoplus mexicanus, Melanoplus sanguinipes, Melanoplus spretus, Nomadacris septemfasciata, Schistocerca ame-ricana, Schistocerca gregaria, Dociostaurus maroccanus, Tachycines asynamorus, Oedaleus senegalensis, Zonozerus variegatus, Hieroglyphus daganensis, Kraussaria angulifera, Callip-tamus italicus, Chooicetes terminifera*, and *Locustana pardaliria*.

In one embodiment, the invention relates to a method for controlling non-crop pest which is selected from crickets, grasshoppers, locusts (Orthoptera), which method comprises applying a compound i) of formula (I).

In another embodiment, the invention relates to a method for controlling non-crop pest which is selected from crickets, grasshoppers, locusts (Orthoptera), which method comprises applying compound ii) of formula (Ia).

In still another embodiment, the invention relates to a method for controlling non-crop pest which is selected from crickets, grasshoppers, locusts (Orthoptera), which method comprises applying a mixture comprising compounds i) and ii).

In a preferred embodiment of the present invention, the compound I, preferably compound i) of formula (I), and compositions comprising it, is used for the protection of non-living organic materials, including but are not limited to house-hold goods such as fats, oils, mono-oligo- or polyorganosaccharides, proteins, or fresh or decaying fruits; cellulose-containing materials e.g. wooden materials such as houses, trees, board fences, or sleepers and also paper; and also materials, furniture, leathers, animal, plant and synthetic fibers, vinyl articles, electric wires and cables as well as styrene foams.

More preferably, the compound i) of formula (I), and compositions comprising it, is used for the protection of non-living organic materials against non-crop pests selected from the group consisting of the class Diplopoda and of the orders Isoptera, Diptera, *Blattaria* (Blattodea), Dermaptera, Hemiptera, Hymenoptera, Orthoptera, and Thysanura.

In another embodiment, the compound ii) of formula (Ia), and compositions comprising it, is used for the protection of non-living organic materials against non-crop pests selected from the group consisting of the class Diplopoda and of the orders Isoptera, Diptera, *Blattaria* (Blattodea), Dermaptera, Hemiptera, Hymenoptera, Orthoptera, and Thysanura.

In still another embodiment, a mixture comprising compounds i) and ii) or compositions comprising such mixture, are used for the protection of non-living organic materials against non-crop pests selected from the group consisting of the class Diplopoda and of the orders Isoptera, Diptera, *Blattaria* (Blattodea), Dermaptera, Hemiptera, Hymenoptera, Orthoptera, and Thysanura.

The invention also relates to above-mentioned textile material for the protection of plants or crops, e.g. tobacco, nuts, fruits, trees, wood.

For example, the nettings or textile material can be impregnated in the manner of a composition as described in WO2005/064072 or WO2008/151984. The netting material, especially a material as described in WO2010/012671, can be used as a protection in the storage of tobacco as described in WO 2007/144401, and can also be used in a similar manner for the protection of other goods.

In the protection of wood, the use of the compounds according to the invention can be done as described in WO2008/142103. In the protection of living plants, the use of the compounds according to the invention can be done as described in WO2012/038460.

The foils or nettings can also be used as mulch foil in the protection of crops.

Furthermore, there is a broad use of the compounds according to the invention, e.g. for protecting stored goods in a container as described e.g. in WO2013/000907.

In one embodiment, the invention relates to a netting, which comprises a compound I, preferably compound i) of formula (I), for the protection of plants, plant propagation material (seeds), fruits, flowers or crops in agriculture, turf, ornamentals or forestry.

In another embodiment, the invention relates to a method for protecting stored goods which are selected from tobacco, nuts, cocoa, fruits, wood; which method comprises applying a compound I, preferably compound i) of formula (I).

The present invention also relates to a method for the protection of non-living organic materials against non-crop pests, preferably against non-crop pests selected from the group consisting of the class Diplopoda and of the orders Isoptera, Diptera, *Blattaria* (Blattodea), Dermaptera, Hemiptera, Hymenoptera, Orthoptera, and Thysanura, comprising contacting the pests or their food supply, habitat, breeding grounds, their locus or the non-living organic materials themselves with a pesticidally effective amount of a compound I, preferably compound i) of formula (I) or a composition comprising it.

Moreover, the compound I, preferably compound i) of formula (I), or a composition comprising it, is preferably used for protecting cellulose-containing non-living organic materials.

Preferably, the compound i) of formula (I), or a composition comprising it, is used for protecting cellulose-containing non-living organic materials against non-crop pests from the Isoptera, Diptera, *Blattaria* (Blattodea), Hymenoptera, and Orthoptera orders.

In another embodiment of the invention the compound ii) of formula (Ia), or a composition comprising it, is used for protecting cellulose-containing non-living organic materials against non-crop pests from the Isoptera, Diptera, *Blattaria* (Blattodea), Hymenoptera, and Orthoptera orders.

In still another embodiment of the invention a mixture comprising compounds i) and ii), or a composition comprising it, is used for protecting cellulose-containing non-living organic materials against non-crop pests from the Isoptera, Diptera, *Blattaria* (Blattodea), Hymenoptera, and Orthoptera orders.

The present invention also provides a method for protecting cellulose-containing nonliving organic materials against non-crop pests, preferably from the Isoptera, Diptera, *Blattaria* (Blattodea), Hymenoptera, and Orthoptera orders, comprising contacting the pests or their food supply, habitat, breeding grounds, their locus or the cellulose-containing non-living organic materials themselves with a pesticidally effective amount of the compound I, preferably compound i) of formula (I), or a composition comprising it.

In another preferred embodiment of the present invention, the compound i) of formula (I), or a composition comprising it, is used for protecting mono- oligo- or polysaccharides and proteins. In another embodiment of the present invention, the compound ii) of formula (Ia), or a composition comprising it, is used for protecting mono- oligo- or polysaccharides and proteins.

In still another embodiment of the present invention, a mixture comprising compounds i) and ii), or a composition comprising such mixture, is used for protecting mono- oligo- or polysaccharides and proteins.

Preferably, compound i) of formula (I), or a composition comprising it, is used for protecting mono- oligo- or polysaccharides and proteins against non-crop pests selected from the Dermaptera, Diplopoda, Isoptera, Diptera, *Blattaria* (Blattodea), Hymenoptera, Orthoptera and Tysanura orders, most preferably the Isoptera, Diptera, *Blattaria* (Blattodea), and Hymenopra orders.

In another embodiment of this invention, compound ii) of formula (Ia), or a composition comprising it, is used for protecting mono- oligo- or polysaccharides and proteins against non-crop pests selected from the Dermaptera, Diplopoda, Isoptera, Diptera, *Blattaria* (Blattodea), Hymenoptera, Orthoptera and Tysanura orders, most preferably the Isoptera, Diptera, *Blattaria* (Blattodea), and Hymenoptra orders.

In still another embodiment of this invention, a mixture comprising compounds i) and ii) or a composition comprising it, is used for protecting mono- oligo- or polysaccharides and proteins against non-crop pests selected from the Dermaptera, Diplopoda, Isoptera, Diptera, *Blattaria* (Blattodea), Hymenoptera, Orthoptera and Tysanura orders, most preferably the Isoptera, Diptera, *Blattaria* (Blattodea), and Hymenoptra orders.

The present invention also provides a method for protecting mono- oligo- or polysaccharides and proteins against non-crop pests, preferably selected from the Dermaptera, Diplopoda, Isoptera, Diptera, *Blattaria* (Blattodea), Hymenoptera, Orthoptera and Tysanura orders, most preferably the Isoptera, Diptera, *Blattaria* (Blattodea), and Hymenoptra orders, comprising contacting the pests or their food supply, habitat, breeding grounds or their locus with a pesticidally effective amount of the compound I, preferably compound i) of formula (I), or a composition comprising it.

Furthermore, the compound I, preferably compound i) of formula (I), or a composition comprising it, is preferably used for protection against non-crop pest of the class Chilopoda, and of the orders Araneida, Hemiptera, Diptera, Phthiraptera, Siphonaptera, Parasitiformes and Acaridida by treatment of the pests in water bodies and/or in and around buildings, including but not limited to walls, ground, manure piles, turf grass, pastures, sewers and materials used in the construction of buildings and also mattresses and bedding, with a pesticidally effective amount of a compound I, preferably compound i) of formula (I) or a composition comprising it.

The compounds, mixtures and compositions of this invention are used to control animal pests, preferably arthropods and more preferably sucking, stinging and chewing insects and arachnids.

The arachnids include essentially mites (for example *Sarcoptes scabiei, Dermatophagoides pteronyssinus, Dermatophagoides farinae, Dermanyssus gallinae, Acarus siro*) and ticks (for example *Ixodes ricinus, Ixodes scapularis, Argas reflexus, Ornithodorus moubata, Rhipicephalus (Boophilus) microplus, Amblyomma hebraeum, Rhipicephalus sanguineus*).

The sucking and stinging insects include gnats (for example *Culicoides furens*), black flies (for example *Simulium damnosum*); flies such as stinging flies (for example *Stomoxys calcitrans*), true flies (for example *Musca domestica, Musca autumnalis, Musca vetustissima, Fannia canicularis*), flesh flies (for example *Sarcophaga carnaria*); bugs (for example *Cimex lectularius, Rhodnius prolixus, Triatoma infestans*); sand fleas (*Tunga penetrans*), wasps (for example *Vespula germanica*).

The chewing insects include essentially cockroaches (for example *Blattella germanica, Periplaneta americana, Blatta orientalis, Supella longipalpa*); beetles (for example *Sitiophilus granarius, Tenebrio molitor, Dermestes lardarius, Stegobium paniceum, Anobium punctatum, Hylotrupes bajulus*), termites (for example *Reticulitermes lucifugus*); ants (for example *Lasius niger, Monomorium pharaonis*); and larvae of moths (for example *Ephestia elutella, Ephestia cautella, Plodia interpunctella, Hofmannophila pseudospretella, Tineola bisselliella, Tinea pellionella, Trichophaga tapetzella*).

Even more preferred, the compound I, preferably compound i) of formula (I), its mixtures and compositions according to this invention are used to control insects and arachnids selected from the group of, flies, wasps, bed bug (*Cimex lectularius*), ants, beetles, cockroaches and/or termites.

Even more preferred, the compound i) of formula (I), its mixtures and compositions are used to control flies.

Even more preferred, the compound i) of formula (I), its mixtures and compositions are used to control wasps.

Even more preferred, the compound i) of formula (I), its mixtures and compositions are used to control bed bugs.

Even more preferred, the compound i) of formula (I), its mixtures and compositions are used to control beetles.

Even more preferred, the compound i) of formula (I), its mixtures and compositions are used to control ants.

Even more preferred, the compound i) of formula (I), its mixtures and compositions are used to control termites.

Even more preferred, the compound i) of formula (I), its mixtures and compositions are used to control cockroaches.

In another embodiment of this invention, the compound ii) of formula (Ia), its mixtures and compositions are used to control flies.

Even more preferred, the compound ii) of formula (Ia), its mixtures and compositions are used to control wasps.

Even more preferred, the compound ii) of formula (Ia), its mixtures and compositions are used to control bed bugs.

Even more preferred, the compound ii) of formula (Ia), its mixtures and compositions are used to control beetles.

Even more preferred, the compound ii) of formula (Ia), its mixtures and compositions are used to control ants.

Even more preferred, the compound ii) of formula (Ia), its mixtures and compositions are used to control termites.

Even more preferred, the compound ii) of formula (Ia), its mixtures and compositions are used to control cockroaches.

In another embodiment of this invention, the mixture comprising compounds i) and ii), its mixtures and compositions are used to control flies.

Even more preferred, the compound ii) of formula (Ia), its mixtures and compositions are used to control wasps.

Even more preferred, the compound ii) of formula (Ia), its mixtures and compositions are used to control bed bugs.

Even more preferred, the compound ii) of formula (Ia), its mixtures and compositions are used to control beetles.

Even more preferred, the compound ii) of formula (Ia), its mixtures and compositions are used to control ants.

Even more preferred, the compound ii) of formula (Ia), its mixtures and compositions are used to control termites.

Even more preferred, the compound ii) of formula (Ia), its mixtures and compositions are used to control cockroaches.

In the case of mixtures, the ratio of the compound i) of formula (I), of compound ii) of formula (Ia), of the mixture comprising compounds (i) and (ii) and the mixture partner, and the total amount of the mixture to be employed, depend on the species and the occurrence of the arthropods. The optimal ratios and overall rates used can be determined for each application by test series. For the use of compound I, preferably compound i) of formula (I) alone, the concentration of compound I, preferably compound i) of formula (I) in the composition may vary from 0.0005 to 10 wt %, from 0.05 to 0.5 wt % or from 0.07 to 0.1 wt %.

The application rate of the compounds, mixtures and compositions according to the invention varies preferably within ranges of between 0.001 and 1000 mg/m$^2$, more preferably, 2 and 500 mg/m$^2$ and even more preferred between 5 and 250 mg/m$^2$.

The compounds, mixtures and compositions of the invention can be converted to the customary compositions as described in this application.

The compounds, mixtures and compositions of the invention can be used for liquid applications such as e.g. a spray solution to control animal pests on a variety of surfaces. The treatment of surfaces for example within or outside from buildings is necessary to control the arthropods such as insects or arachnids. There is a great need for protecting the inhabitants effectively and with a long-lasting residuality. Moreover, reasons of hygiene and structural engineering require that animal pests be prevented from entering into buildings, spreading and dwelling in buildings and infesting wood or other materials.

Other uses include the intergration or coating of the active compound composition according to the invention into/of materials such as pellets, granules, dusts, yarns, foils, textiles, wovens, braids, knits, felts, nonwovens, curtains, draperies, tarpaulins, fabrics, wood, papers, furnitures, fences in particular animal fences, paints etc. (integration of active ingredients into foils and nets is e.g. described in WO-A-2009/121580; WO 2013/117521, WO 2011/128380).

The present invention also relates to a material which comprises the active compound composition of the invention. The material is preferably selected from the group of foil, mat, net, textile, woven, braid, knit, felt, nonwoven, curtain, drapery, tarpaulin, fabric, wood, paper, furniture, fence preferably animal fence, paint. Another preferred embodiment of the invention relates to a bed bug bait which comprises the active compound composition of the invention and means to attract bed bugs. Means to attract bed bugs are known to a skilled person in the art (see e.g. WO 2011/149899).

Alternatively, in another embodiment of the invention, the compounds, mixtures and compositions are used to control bed bugs via an ovicidial activity. For this purpose, the compounds, mixtures and compositions of the invention are applied to (e.g. sprayed on) bed bugs and eggs directly (such as e.g. on bedsprings, box springs, and the interior of bed frames or headboards, including all cracks and joints).

In the case of mixtures, a synergistic effect of the active compound combination is always present when the activity of the active compound combination exceeds the total of the activities of the active compounds when applied individually.

The expected activity for a given combination of two active compounds can be calculated according to S. R. Colby, Weeds 15 (1967), 20-22.

If, in the context of this description, the short form of the "common name" of an active compound is used, this comprises in each case all customary derivatives, such as the esters and salts, and isomers, in particular optical isomers, especially the commercially available form or forms. If the "common name" refers to an ester or a salt, this in each case also comprises all other customary derivatives, such as other esters and salts, the free acids and neutral compounds, and isomers, in particular optical isomers, especially the commercially available form or forms.

Methods for Controlling a Population of Social Insects

The subject of the present invention is a method for controlling a population of social insects, preferably ants, termites and wasps.

It is often very desirable to combat the drawbacks caused by populations of social insects such as ants or termites or wasps, especially in the case of ant populations. Social insects are insects which live in a large society, or in a colony comprising a large number of such insects or congeners.

The expression social insects refer to the observation, that some insects may show "social" behaviors (e.g. feeding aggregations, parental care of the young, and communal nest sites). In order to qualify as 'eusocial', meaning being "truly social", a species must exhibit all four of the following characteristics, such as first, share of a common nest site, second, cooperation by the individuals in caring for the young, third "division of labor" meaning that sterile (or less fecund) individuals work for the benefit of a few reproductive individuals and last, offspring would contribute to colony labor while their parents are still alive (J. R. Meyer, NC State University, 2005).

In the case of ants, for example, these drawbacks generally stem from the inconvenience caused to individuals by the presence or passage of columns of ants in living areas or in the immediate vicinity thereof, such as in the garden or on the patio. The passage of such columns of ants on the lawn next to a private house may especially be particularly unpleasant for the resident wishing to relax by stretching out on the said lawn, on account of the bites inflicted by certain species.

The control of ants is also desirable as regards the cultivation of fruit trees and/or ornamental trees. The reason for this is that certain species of ant provide a role of defending aphids against their predators and thus contribute towards maintaining high populations of aphids, which are harmful to the good health of the trees concerned and/or to fruit yields.

Certain species of ant sometimes cause even greater inconvenience. Thus, the pharaoh ant (*Monomorium pharaonis*) may create anthills even inside living areas, which, in the case of blocks of flats poses problems.

Now, the inconvenience and/or damage caused by social insects such as ants or termites or wasps, preferably ants, are in direct proportion with the sometimes very large number which a population of such insects may reach, for example, in the case of ants, the very large number of individuals in the population of an anthill.

Methods for controlling ants or termites or wasps or cockroaches using insecticidal compounds are known. However, these methods are not always satisfactory.

The reason for this is that they often destroy only a small portion of the population concerned, for example, in the case of ants, a fraction of the workers whose function is to collect food outside the anthill. The destruction of this population category is not, however, sufficient to overcome the drawbacks caused by the ants. Indeed, the large capacity of ants to proliferate and their specialization based on the needs of the anthill are capable of rapidly compensating for this destruction, bringing about a new increase in the population.

The known methods moreover have the drawback that it is very difficult to treat all the individuals of the population, especially on account of the fact that, as regards ants, the anthills are fairly inaccessible, since they are generally located at a depth of several tens of centimetres below the surface of the ground.

One aim of the present invention is to overcome these drawbacks.

Another aim of the present invention is to ensure the destruction of the larvae present in the anthill, or more generally in the nest or dwelling place of the said social insects.

Another aim of the present invention is to ensure the destruction of the laying females present in the anthill, or more generally in the nest or dwelling place of the said social insects.

Another aim of the present invention is to propose a method which allows the definitive destruction of all or almost all of a population of social insects such as ants or termites or wasps, preferably such as ants, or in another embodiment such as termites.

It has now been found that these aims could be totally or partly achieved by means of the control method according to the invention which is described in detail below.

The subject of the present invention is thus a method for controlling a population of social insects such as ants or termites or wasps, characterized in that there is applied to a minor fraction of this population an effective amount of a composition comprising a bait and a compound I, preferably compound i) of formula (I) as defined herein.

Populations of ants are preferred among the populations of social insects which may be controlled using the method according to the invention.

Populations of termites are also preferred among the populations of social insects which may be controlled using the method according to the invention.

In the sense of the present invention, control of a population of social insects such as ants, termites, wasps is understood to mean the control of the said insects, and more particularly the total or almost total destruction of the said population, in other words the destruction of more than 60%, preferably more than 70% and even more preferably of 95 to 100%, of the said population.

An effective amount of the composition used in the method according to the invention is understood to mean an amount which is capable of controlling the whole population of social insects such as a population of ants or termites or wasps.

More particularly, the invention relates to a method for treating social insects such as ants, termites, or wasps with an effective amount of compound I, preferably compound i) of formula (I), this effective amount of composition being an amount used equal to the dose required to destroy at least 90 percent of the minor fraction of the population of social insects to which the said composition is applied, within a period of between 2 and 30 days, preferably between 2 and 7 days. The minor fraction often corresponds in practice to the population living or circulating outside the common dwelling place or nest.

According to a more preferred variant of the invention, when the population of social insects is a population of ants, the effective amount of composition used for the method according to the invention may be determined more precisely within this range by systematic tests, depending on the species of ant whose population it is desired to control, and also depending on the size and extent of the anthills which may vary according to the nature of these species.

The invention thus also relates to a method for controlling social insects such as ants, termites, wasps which have a common dwelling place or nest in which they live with a substantial population of their congeners, the said method comprising a treatment with an effective dose of one or more areas frequented by, or assumed to be frequented by, the said social insects, the said area being outside the place of the said common dwelling but being a place in which the social insect circulate or are assumed to circulate.

The ants which may be controlled using the method according to the invention are especially:

ants of the genus *Lasius*, for example the black ant (*Lasius niger*);

the pavement ant (*Tetramorium caespitum*);

the pharaoh ant (*Monomorium pharaonis*);

the Argentine ant (*Iridomyrmex humilis*);

fire ants belonging to the genus *Solenopsis*;

fungal ants, such as the ants of the genus *Acromyrmex* (for example the cassaya ant) and the ants of the genus *Atta*.

Although the paragraphs above refer to social insects, the methods of application and the uses according to the present invention may in general also be applied to non-social solitary or gregarious insects, like cockroaches, which are commonly not categorized as social insects. Therefore cockroaches are non-crop pests, which are also preferably controlled and conbated by the methods of the present invention, and such methods and uses are further embodiments of the present invention.

The cockroaches which may be treated by the method of the invention are preferably selected from *Blatella germanica, Blatella orientalis, Periplaneta americana, Periplaneta fuliginosa*.

The bait employed in the composition used in the method according to the invention is a product which is sufficiently appetizing to incite cockroaches and social insects such as ants or wasps to eat it. In the case of ants, this bait is for example selected from animal and/or plant proteins, or alternatively from fats, also of animal and/or plant origin, or even from mono-, oligo- or polyorganosaccharides, especially from sucrose, lactose, fructose, dextrose, glucose or even molasses or honey.

The minor fraction of the population to which the composition employed in the method according to the invention is applied is generally between 1 and 50 percent of the total population, preferably between 2 and 20 percent.

According to a preferred variant of the invention, the population of ants which may be controlled using the method according to the invention is a population of ants living in the same anthill. In this case, the minor fraction of the population to which the composition is applied generally consists of workers whose function is to collect food from outside the anthill, these being known as the harvester workers of the anthill.

According to another preferred variant of the invention, the ant or cockroach population which can be controlled by means of the method according to the invention is a population of cockroaches living in the same common dwelling place for cockroaches.

The dose of compound I, preferably compound i) of formula (I) in the composition used is between 0.0005 and 0.5 percent, preferably between 0.001 and 0.2 percent. However, applicable doses may further range from 0.05 to 0.1 or 0.5 percent, and for some applications the dose may even rise to up to 10 percent.

In the present text, the percentages corresponding to doses are, except where otherwise mentioned, weight/weight percentages.

The dose of bait in the composition used is generally between 1 and 99 percent, preferably between 30 and 99%. The composition used may also comprise other additives such as a solvent for the active material, a flavoring, a preserving agent, a dye or a bitter agent.

According to a particularly advantageous variant of the method according to the invention, it is preferred to apply the composition by placing it in a closed bait-carrier box containing openings which are reserved, on account of their size, for the exclusive use of ants or cockroaches, or insects of similar size, in an area where these insects are likely to be found. The area may especially be in a public or private place, such as a living area, or alternatively on a balcony, a patio, in a garden or in a field. This variant is of improved safety, since it concerns an active material which is liable to present a risk in the case of accidental contact or ingestion by pets or children. The details of applications for termites are in principle the same as described herein for ants. In addition, the methods and uses according to the invention may also be applied in buildings and construction, e.g. houses. According to climatic conditions and occurrence of termites, it may be a relevant goal to protect houses and other buildings from termites.

In particular, the invention relates to:

Methods according to the invention, wherein the non-crop pests are controlled by professional treatment of households and other structures, which may be open to a certain degree to public such as rural, urban, commercial, industrial and governmental areas, in and around farm premises, structures and animal housing.

Methods for controlling a population of social insects, comprising contacting the pests or their food supply, habitat, breeding grounds or their locus with the pesticidally active carboxamide compound i) of formula (I) as defined herein.

Methods for controlling a population of social insects, comprising contacting the pests or their food supply, habitat, breeding grounds or their locus with the pesticidally active carboxamide compound ii) of formula (Ia) as defined herein.

Methods for controlling a population of social insects, comprising contacting the pests or their food supply, habitat, breeding grounds or their locus with the pesticidally active carboxamide mixture comprising compounds i) and ii) as defined herein.

Methods for controlling a population of non-social solitary or gregarious insects, comprising contacting the pests or their food supply, habitat, breeding grounds or their locus with the pesticidally active carboxamide compound i) of formula (I) as defined herein.

Methods for controlling a population of non-social solitary or gregarious insects, comprising contacting the pests or their food supply, habitat, breeding grounds or their locus with the pesticidally active carboxamide compound ii) of formula (Ia) as defined herein.

Methods for controlling a population of non-social solitary or gregarious insects, comprising contacting the pests or their food supply, habitat, breeding grounds or their locus with the pesticidally active carboxamide mixture comprising compounds i) and ii) as defined herein.

Methods according to the invention, wherein the non-crop pest is selected from flies (Diptera).

Methods according to the invention, wherein the non-crop pest is selected from termites (Isoptera).

Method according to the invention, wherein the non-crop pest is selected from ants (Hymenoptera).

Method according to the invention, wherein the non-crop pest is selected from crickets, grasshoppers, locusts (Orthoptera).

Methods according to the invention, wherein the non-crop pest is selected from cockroaches (Blattodea).

Methods according to the invention, wherein the non-crop pest is selected from bed bugs (Hemiptera).

Baits comprising the carboxamide compound i) of formula (I), alone or in combination with at least one other pesticidal active ingredient, preferably selected from the insecticides listed further below.

Baits comprising the carboxamide compound ii) of formula (Ia), alone or in combination with at least one other pesticidal active ingredient, preferably selected from the insecticides listed further below.

Baits comprising the mixture comprising compounds i) and ii), alone or in combination with at least one other pesticidal active ingredient, preferably selected from the insecticides listed further below.

Compositions comprising the carboxamide compound of formula (I), alone or in combination with at least one other pesticidal active ingredient, preferably selected from the insecticides listed further below.

Compositions comprising the carboxamide compound ii) of formula (Ia), alone or in combination with at least one other pesticidal active ingredient, preferably selected from the insecticides listed further below.

Compositions comprising the mixture comprising compounds i) and ii), alone or in combination with at least one other pesticidal active ingredient, preferably selected from the insecticides listed further below.

Nettings or textile material impregnated with the carboxamide compound i) of formula (I).

Nettings or textile material impregnated with the carboxamide compound ii) of formula (Ia).

Nettings or textile material impregnated with a mixture comprising compounds i) and ii).

Methods according to the invention, wherein stored products are protected from pests, especially methods according to the invention, wherein the stored product is selected from tobacco, nuts, cocoa, fruits, wood.

Methods according to the invention, wherein the stored products are protected by a netting or textile material, impregnated with compound i) of formula (I) as defined herein.

Methods according to the invention, wherein the stored products are protected by a netting or textile material, impregnated with compound ii) of formula (Ia) as defined herein.

Methods according to the invention, wherein the stored products are protected by a netting or textile material, impregnated with a mixture comprising compounds i) and ii).

Uses of the carboxamide compound i) of formula (I) as defined herein, or a composition comprising said compound,
for controlling a population of social insects, and/or
for controlling non-crop pests, and/or
for controlling termites (Isoptera), and/or
for controlling ants (Hymenoptera), and/or
for controlling wasps (Hymenoptera), and/or for controlling flies (Diptera), and/or
for controlling bed bugs (Heminoptera), and/or
for controlling cockroaches (Blattodea), and/or
for controlling crickets, grasshoppers, locusts (Orthoptera)
for protecting stored products, and/or
for protecting stored tobacco, nuts, cocoa, fruits, wood.

Uses of the carboxamide compound ii) of formula (Ia) as defined herein, or a composition comprising said compound,
for controlling a population of social insects, and/or
for controlling non-crop pests, and/or
for controlling termites (Isoptera), and/or
for controlling ants (Hymenoptera), and/or
for controlling wasps (Hymenoptera), and/or
for controlling flies (Diptera), and/or
for controlling bed bugs (Heminoptera), and/or
for controlling cockroaches (Blattodea), and/or
for controlling crickets, grasshoppers, locusts (Orthoptera)
for protecting stored products, and/or
for protecting stored tobacco, nuts, cocoa, fruits, wood.

Uses of a mixture comprising compounds i) and ii) as defined herein, or a composition comprising said mixture,
for controlling a population of social insects, and/or
for controlling non-crop pests, and/or
for controlling termites (Isoptera), and/or
for controlling ants (Hymenoptera), and/or
for controlling wasps (Hymenoptera), and/or
for controlling flies (Diptera), and/or
for controlling bed bugs (Heminoptera), and/or
for controlling cockroaches (Blattodea), and/or
for controlling crickets, grasshoppers, locusts (Orthoptera)
for protecting stored products, and/or
for protecting stored tobacco, nuts, cocoa, fruits, wood.

Formulations

In the methods and uses according to the invention, the compounds I, preferably compound i) of formula (I) are used in the form of compositions comprising an auxiliary and the carboxamide compound I, preferably compound i) of formula (I) according to the invention.

A composition comprises a pesticidally effective amount of a compound I selected from i) compound i of formula (I), compound ii) of formula (Ia), and mixture comprising compounds i) and ii), preferably compound i) of formula (I).

The term "effective amount" denotes an amount of the composition or of the compounds I, which is sufficient for controlling invertebrate pests in non-crop applications, e.g. in the protection of materials and which does not result in a substantial damage to the treated locus or material. Such an amount can vary in a broad range and is dependent on various factors, such as the invertebrate (e.g. insect) species to be controlled, the treated material, the climatic conditions and the specific compound I used.

The compound I can be converted into customary types of compositions, e.g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations (e.g. GF). These and further compositions types are defined in the "Catalogue of pesticide formulation types and international coding system", Technical Monograph No. 2, 6$^{th}$ Ed. May 2008, CropLife International.

The compositions are prepared in a known manner, such as e.g. described by Mollet and Grubemann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines, amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or poly-ethyleneamines.

Suitable adjuvants are compounds, which have a neglectable or even no pesticidal activity themselves, and which improve the biological performance of the compound I on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are e.g. polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are e.g. ethylene glycol, propylene glycol, urea and glycerin.

Suitable anti-foaming agents are e.g. silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are e.g. polyvinylpyrrolidons, polyvinylacetates, polyvinyl alcohols, polyacrylates, biological or synthetic waxes, and cellulose ethers.

Examples for composition types and their preparation are:
i) Water-Soluble Concentrates (SL, LS)
10-60 wt % of a compound I, preferably compound i) of formula (I), according to the invention and 5-15 wt % wetting agent (e.g. alcohol alkoxylates) are dissolved in water and/or in a water-soluble solvent (e.g. alcohols) up to 100 wt %. The active substance dissolves upon dilution with water.

ii) Dispersible Concentrates (DC)
5-25 wt % of a compound I, preferably compound i) of formula (I), according to the invention and 1-10 wt % dispersant (e.g. polyvinylpyrrolidone) are dissolved in up to 100 wt % organic solvent (e.g. cyclohexanone). Dilution with water gives a dispersion.

iii) Emulsifiable Concentrates (EC)
15-70 wt % of a compound I, preferably compound i) of formula (I), according to the invention and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.

iv) Emulsions (EW, EO, ES)
5-40 wt % of a compound I, preferably compound i) of formula (I), according to the invention and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)
In an agitated ball mill, 20-60 wt % of a compound I, preferably compound i) of formula (I), according to the invention are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active substance. For FS type composition up to 40 wt % binder (e.g. polyvinylalcohol) is added.

vi) Water-Dispersible Granules and Water-Soluble Granules (WG, SG)
50-80 wt % of a compound I, preferably compound i) of formula (I), according to the invention are ground finely with addition of up to 100 wt % dispersants and wetting agents (e.g. sodium lignosulfonate and alcohol ethoxylate) and prepared as water-dispersible or water-soluble granules by means of technical appliances (e.g. extrusion, spray tower, fluidized bed). Dilution with water gives a stable dispersion or solution of the active substance.

vii) Water-Dispersible Powders and Water-Soluble Powders (WP, SP, WS)
50-80 wt % of a compound I, preferably compound i) of formula (I), according to the invention are ground in a rotor-stator mill with addition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dispersion or solution of the active substance.

viii) Gel (GW, GF)
In an agitated ball mill, 5-25 wt % of a compound I, preferably compound i) of formula (I), according to the invention are comminuted with addition of 3-10 wt % dispersants (e.g. sodium lignosulfonate), 1-5 wt % thickener (e.g. carboxymethylcellulose) and up to 100 wt % water to give a fine suspension of the active substance. Dilution with water gives a stable suspension of the active substance.

ix) Microemulsion (ME)
5-20 wt % of a compound I, preferably compound i) of formula (I), according to the invention are added to 5-30 wt % organic solvent blend (e.g. fatty acid dimethylamide and cyclohexanone), 10-25 wt % surfactant blend (e.g. alkohol ethoxylate and arylphenol ethoxylate), and water up to 100%. This mixture is stirred for 1 h to produce spontaneously a thermodynamically stable microemulsion.

x) Microcapsules (CS)
An oil phase comprising 5-50 wt % of a compound I, preferably compound i) of formula (I), according to the invention, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a compound I, preferably compound i) of formula (I), according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsules. The monomers amount to 1-10 wt %. The wt % relate to the total CS composition.

xi) Dustable Powders (DP, DS)

1-10 wt % of a compound I, preferably compound i) of formula (I), according to the invention are ground finely and mixed intimately with up to 100 wt % solid carrier, e.g. finely divided kaolin.

xii) Granules (GR, FG)

0.5-30 wt % of a compound I, preferably compound i) of formula (I), according to the invention is ground finely and associated with up to 100 wt % solid carrier (e.g. silicate). Granulation is achieved by extrusion, spray-drying or the fluidized bed.

xiii) Ultra-Low Volume Liquids (UL)

1-50 wt % of a compound I, preferably compound i) of formula (I), according to the invention are dissolved in up to 100 wt % organic solvent, e.g. aromatic hydrocarbon.

The compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The compositions generally comprise between 0.01 and 95%, preferably between 0.1 and 90%, and most preferably between 0.5 and 75%, by weight of active substance. The active substances are employed in a purity of from 90% to 100%, preferably from 95% to 100% (according to NMR spectrum).

When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use. These agents can be admixed with the compositions according to the invention in a weight ratio of 1:100 to 100:1, preferably 1:10 to 10:1.

Mixtures

In the methods and uses according to the invention, the compound I of the present invention, preferably compound i) of formula (I), may be preferably applied with other active ingredients. Such other actives may be, for example other pesticides, insecticides, herbicides, fertilizers such as ammonium nitrate, urea, potash, and superphosphate, phytotoxicants and plant growth regulators, safeners and nematicides.

These additional ingredients may be used sequentially or in combination with the above-described compositions, if appropriate also added only immediately prior to use (tank mix). For example, the plant(s) may be sprayed with a composition of this invention either before or after being treated with other active ingredients.

In a particular embodiment of the invention, in the methods and uses according to the invention, the compound I, preferably compound i) of formula (I), is combined with one or more other pesticidally active compound(s) II selected from insecticides.

Therefore, the present invention also relates to methods and uses, wherein a mixture or composition comprising at least one compound I, preferably compound i) of formula (I), and one further pesticide is are applied.

Preferred Mixtures for the Application

The following list M of pesticides, grouped and numbered according the Mode of Action Classification of the Insecticide Resistance Action Committee (IRAC), together with which the carboxamide compounds i) of formula (I), ii) of formula (Ia), and mixture comprising compounds i) and ii) according to the present invention can be used and with which mixture partners optionally synergistic effects might be produced, is intended to illustrate the possible combinations, but not to impose any limitation:

M.1 Acetylcholine esterase (AChE) inhibitors from the class of

M.1A bendiocarb, carbaryl, carbosulfan, methiocarb, oxamyl, propoxur; or from the class of M.1B organophosphates, for example acephate, chlorpyrifos, diazinon, dichlorvos/DDVP, dimethoate, ethion, fenthion, isoxathion, malathion, parathion, parathion-methyl, phoxim, pirimiphosmethyl, temephos and trichlorfon;

M.2. GABA-gated chloride channel antagonists such as:

M.2B fiproles (phenylpyrazoles), as for example ethiprole, fipronil and pyriprole;

M.3 Sodium channel modulators from the class of

M.3A pyrethroids, for example acrinathrin, allethrin, d-cis-trans allethrin, d-trans allethrin, bifenthrin, cyfluthrin, beta-cyfluthrin, lambda-cyhalothrin, cypermethrin, alpha-cypermethrin, zeta-cypermethrin, deltamethrin, esfenvalerate, etofenprox, fenvalerate, flucythrinate, heptafluthrin, metofluthrin, momfluorothrin, permethrin, phenothrin, prallethrin, profluthrin, pyrethrin (pyrethrum), resmethrin, tetramethrin and tralomethrin;

M.4 Nicotinic acetylcholine receptor agonists (nAChR) from the class of

M.4A neonicotinoids, for example acetamiprid, chlothianidin, cycloxaprid, dinotefuran, imidacloprid, nitenpyram, thiacloprid and thiamethoxam;

M.5 Nicotinic acetylcholine receptor allosteric activators from the class of spinosyns, for example spinosad;

M.6 Chloride channel activators from the class of avermectins and milbemycins, for example abamectin and emamectin benzoate;

M.7 Juvenile hormone mimics, such as

M.7A juvenile hormone analogues as hydroprene and methoprene; or others as M.7B fenoxycarb or M.7C pyriproxyfen;

M.8 miscellaneous non-specific (multi-site) inhibitors, for example

M.8C sulfuryl fluoride or M.8D borax;

M.9 Selective homopteran feeding blockers, for example

M.9B pymetrozine;

M.10 Mite growth inhibitors, for example

M.10A clofentezine and hexythiazox or M.10B etoxazole;

M.11 Microbial disruptors of insect midgut membranes, for example *Bacillus thuringiensis* including its subspecies, e.g. subsp. *israelensis*, subsp. *aizawai*, subsp. *kurstaki* and subsp. *tenebrionis*, as well as the insecticidal proteins they produce;

M.12 Inhibitors of mitochondrial ATP synthase, for example

M.12A diafenthiuron, or

M.12B organotin miticides such as azocyclotin, cyhexatin or fenbutatin oxide, or M.12C propargite;

M.13 Uncouplers of oxidative phosphorylation via disruption of the proton gradient, for example chlorfenapyr or sulfluramid;

M.15 Inhibitors of the chitin biosynthesis type 0, such as benzoylureas as for example diflubenzuron, flufenoxuron, hexaflumuron, novaluron, noviflumuron, teflubenzuron and triflumuron;

M.16 Inhibitors of the chitin biosynthesis type 1, as for example buprofezin;

M.17 Moulting disruptors, Dipteran, as for example cyromazine;

M.18 Ecdyson receptor agonists such as diacylhydrazines, for example tebufenozide and halofenozide;

M.19 Octopamin receptor agonists, as for example amitraz;

M.20 Mitochondrial complex III electron transport inhibitors, for example

M.20A hydramethylnon;

M.21 Mitochondrial complex I electron transport inhibitors, for example

M.21A METI acaricides and insecticides such as fenazaquin, pyridaben and tebufenpyrad;

M.22 Voltage-dependent sodium channel blockers, for example

M.22A indoxacarb, or M.22B metaflumizone;

M.23 Inhibitors of the of acetyl CoA carboxylase, such as Tetronic and Tetramic acid derivatives, for example spiromesifen and spirotetramat;

M.24 Mitochondrial complex IV electron transport inhibitors, for example

M.24A phosphine such as aluminium phosphide;

M.25 Mitochondrial complex II electron transport inhibitors, such as beta-ketonitrile derivatives, for example cyenopyrafen or cyflumetofen;

M.28 Ryanodine receptor-modulators from the class of diamides, as for example flubendiamide, chlorantraniliprole (Rynaxypyr®), cyantraniliprole (Cyazypyr®), tetraniliprole or cyclaniliprole, or the compound M.28.5a) to M.28.5l):

M.28.5a) N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide;

M.28.5b) N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide;

M.28.5c) N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide;

M.28.5d) N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide;

M.28.5h) N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide;

M.UN. insecticidal active compounds of unknown or uncertain mode of action, as for example afidopyropen, azadirachtin, bifenazate, flometoquin, fluensulfone, flupyradifurone, methoxadiazone, piperonyl butoxide, pyflubumide, sulfoxaflor, tioxazafen or triflumezopyrim;

The commercially available compounds of the group M listed above may be found in The Pesticide Manual, 15th Edition, C. D. S. Tomlin, British Crop Protection Council (2011) among other publications.

The neonicotinoid cycloxaprid is known from WO20120/069266 and WO2011/06946 The anthranilamides M.28.5a) to M.28.5h) can be prepared as described in WO 2007/006670, WO2013/024009 and WO2013/024010. The quinoline derivative flometoquin is shown in WO2006/013896. The aminofuranone compounds flupyradifurone is known from WO 2007/115644. The sulfoximine compound sulfoxaflor is known from WO2007/149134. From the pyrethroids group momfluorothrin is known from U.S. Pat. No. 6,908,945 and heptafluthrin from WO10133098. The pyrazole acaricide pyflubumide is known from WO2007/020986. The pyripyropene derivative afidopyropen has been described in WO 2006/129714. The nematicide tioxazafen has been disclosed in WO09023721 and nematicide fluopyram in WO2008126922, nematicidal mixtures comprising flupyram in WO2010108616. The oxadiazolone methoxadiazone is known from JP13/166707. The triflumezopyrim compound was described in WO2012/092115.

When applied in the methods and uses according to the present invention for controlling or combating non-crop pests, or for the prevention of infestation by such pests, the compound of formula (I) is preferably combined with another pesticidal active selected from the list above. With regard to such mixtures according to the present invention, which target non-crop pests, the following pesticidal active compounds (11) are especially preferred, when applied in combination with the carboxamide compound of formula (I):

With regard to the use in a pesticidal mixture of the present invention, a compound II selected from group of AChE-inhibitors as defined above is preferred, in particular selected from the group of carbamates, such as one of the following actives: bendiocarb, carbaryl, methiocarb or propoxur.

Mixtures of the carboxamide compound I, preferably compound i) of the formula (I) as component I with bendiocarb as compound II are particularly preferred.

Mixtures of the carboxamide compound I, preferably compound i) of the formula (I) as component I with carbaryl as compound II are particularly preferred.

Mixtures of the carboxamide compound I, preferably compound i) of the formula (I) as component I with methiocarb as compound II are particularly preferred.

Mixtures of the carboxamide compound I, preferably compound i) of the formula (I) as component I with propoxur as compound II are particularly preferred.

With regard to the use in a pesticidal mixture of the present invention, a compound II selected from group of AChE-inhibitors as defined above is preferred, in particular selected from the group organophosphates, such as one of the following actives: acephate, chlorpyrifos, diazinon, dichlorovos/DDVP, dimethoate, malathion, temephos or trichlorfon.

Mixtures of the carboxamide compound I, preferably compound i) of the formula (I) as component I with acephate as component II are particularly preferred.

Mixtures of the carboxamide compound I, preferably compound i) of the formula (I) as component I with chlorpyrifos as component II are particularly preferred.

Mixtures of the carboxamide compound I, preferably compound i) of the formula (I) as component I with diazinon as component II are particularly preferred.

Mixtures of the carboxamide compound I, preferably compound i) of the formula (I) as component I with dichlorovos/DDVP as component II are particularly preferred.

Mixtures of the carboxamide compound I, preferably compound i) of the formula (I) as component I with dimethoate as component II are particularly preferred.

Mixtures of the carboxamide compound I, preferably compound i) of the formula (I) as component I with malathion as component II are particularly preferred.

Mixtures of the carboxamide compound I, preferably compound i) of the formula (I) as component I with temephos as component II are particularly preferred.

Mixtures of the carboxamide compound I, preferably compound i) of the formula (I) as component I with trichlorfon as component II are particularly preferred.

With regard to the use in a pesticidal mixture of the present invention, a compound II selected from group of GABA-gated chloride channel antagonists as defined above is preferred, in particular selected from the group of fiproles.

Mixtures of the carboxamide compound I, preferably compound i) of the formula (I) as component I with fipronil as component II are particularly preferred.

With regard to the use in a pesticidal mixture of the present invention, a compound II selected from group of Sodium channel modulators as defined above is preferred, in particular selected from the groups of pyrethroids, such as one of the following actives: alpha-cypermethrin, bifenthrin, beta-cyfluthrin, cyfluthrin, lamba-cylohalothrin, cypermethrin, deltamethrin, esfenvalerate, etofenprox, permethrin, phenothrin, pyrethrin (pyrethrum) or tetramethrin.

Mixtures of the carboxamide compound I, preferably compound i) of the formula (I) as component I with alpha-cypermethrin as component II are particularly preferred.

Mixtures of the carboxamide compound I, preferably compound i) of the formula (I) as component I with bifenthrin as component II are especially preferred.

Mixtures of the carboxamide compound I, preferably compound i) of the formula (I) as component I with beta-cyfluthrin as component II are especially preferred.

Mixtures of the carboxamide compound I, preferably compound i) of the formula (I) as component I with cyfluthrin as component II are especially preferred.

Mixtures of the carboxamide compound I, preferably compound i) of the formula (I) as component I with lambda-cyhalothrin as component II are especially preferred.

Mixtures of the carboxamide compound I, preferably compound i) of the formula (I) as component I with cypermethrin as component II are especially preferred.

Mixtures of the carboxamide compound I, preferably compound i) of the formula (I) as component I with deltamethrin as component II are especially preferred.

Mixtures of the carboxamide compound I, preferably compound i) of the formula (I) as component I with esfenvalerate as component II are especially preferred.

Mixtures of the carboxamide compound I, preferably compound i) of the formula (I) as component I with etofenprox as component II are especially preferred.

Mixtures of the carboxamide compound I, preferably compound i) of the formula (I) as component I with permethrin as component II are especially preferred.

Mixtures of the carboxamide compound I, preferably compound i) of the formula (I) as component I with phenothrin as component II are especially preferred.

Mixtures of the carboxamide compound I, preferably compound i) of the formula (I) as component I with pyrethrin as component II are especially preferred.

Mixtures of the carboxamide compound I, preferably compound i) of the formula (I) as component I with tetramethrin as component II are especially preferred.

With regard to the use in a pesticidal mixture of the present invention, a compound II selected from group of Neonicotinoids as defined above is preferred, in particular acetamiprid, clothianidin, dinotefuran, imidacloprid, thiacloprid, or thiamethoxam.

Mixtures of the carboxamide compound I, preferably compound i) of the formula (I) as component I with acetamiprid as component II are especially preferred.

Mixtures of the carboxamide compound I, preferably compound i) of the formula (I) as component I with thiamethoxam as component II are especially preferred.

Mixtures of the carboxamide compound I, preferably compound i) of the formula (I) as component I with clothianidin as component II are also preferred.

Mixtures of the carboxamide compound I, preferably compound i) of the formula (I) as component I with dinotefuran as component II are also preferred.

Mixtures of the carboxamide compound I, preferably compound i) of the formula (I) as component I with imidacloprid as component II are also preferred.

Mixtures of the carboxamide compound I, preferably compound i) of the formula (I) as component I with thiacloprid as component II are also preferred.

With regard to the use in a pesticidal mixture of the present invention, in an embodiment of the invention, the compound II is selected from group of Nicotinic acetylcholine receptor allosteric activators.

Mixtures of the carboxamide compound I, preferably compound i) of the formula (I) as component I with spinosad as component II are preferred.

With regard to the use in a pesticidal mixture of the present invention, in an embodiment of the invention, the compound II is selected from group of Chloride channel activators, and is preferably an avermectin.

Mixtures of the carboxamide compound I, preferably compound i) of the formula (I) as component I with abamectin as component II are especially preferred.

With regard to the use in a pesticidal mixture of the present invention, in an embodiment of the invention, the compound II is selected from group of juvenile hormone mimics, such the juvenile hormone analogues hydropene or methoprene, or others, like pyriproxyfen.

Mixtures of the carboxamide compound I, preferably compound i) of the formula (I) as component I with hydropene as component II are especially preferred.

Mixtures of the carboxamide compound I, preferably compound i) of the formula (I) as component I with methoprene as component II are especially preferred.

Mixtures of the carboxamide compound I, preferably compound i) of the formula (I) as component I with pyriproxyfen as component II are especially preferred.

With regard to the use in a pesticidal mixture of the present invention, in an embodiment of the invention, the compound II is selected from group of miscellaneous non-specific (multi-site) inhibitors, such as sulfuryl fluoride or borax.

Mixtures of the carboxamide compound I, preferably compound i) of the formula (I) as component I with sulfuryl fluoride as component II are especially preferred.

Mixtures of the carboxamide compound I, preferably compound i) of the formula (I) as component I with borax as component II are especially preferred.

With regard to the use in a pesticidal mixture of the present invention, in an embodiment of the invention, the compound II is selected from group of Mite growth inhibitors), such as one of the following actives: clofentezine, hexythiazox or etoxazole.

Mixtures of the carboxamide compound I, preferably compound i) of the formula (I) as component I with clofentezine as component II are especially preferred.

Mixtures of the carboxamide compound I, preferably compound i) of the formula (I) as component I with hexythiazox as component II are especially preferred.

Mixtures of the carboxamide compound I, preferably compound i) of the formula (I) as component I with etoxazole as component II are especially preferred.

With regard to the use in a pesticidal mixture of the present invention, in an embodiment of the invention, the component II is selected from group of microbial disruptors of insect midgut membranes, such as *Bacillus thuringensis* and its subspecies, including, among optional others, the subspecies *israelensis, aizawai, tenebrionis* and *kurstaki*, as well as the respective insecticidal proteins they produce.

With regard to the use in a pesticidal mixture of the present invention, in an embodiment of the invention, the component II is selected from group of uncouplers of oxidative phosphorylation via disruption of the proton gradient.

Mixtures of the carboxamide compound I, preferably compound i) of the formula (I) as component I with chlorfenapyr as component II are especially preferred.

With regard to the use in a pesticidal mixture of the present invention, in an embodiment of the invention, the compound II is selected from group of Inhibitors of the chitin biosynthesis type 0) such as the following benzoylureas, for example diflubenzuron, flufenoxuron, hexaflumuron, novaluron, noviflumuron, teflubenzuron or triflumuron.

Mixtures of the carboxamide compound I, preferably compound i) of the formula (I) as component I with diflubenzuron as component II are especially preferred.

Mixtures of the carboxamide compound I, preferably compound i) of the formula (I) as component I with flufenoxuron as component II are especially preferred.

Mixtures of the carboxamide compound I, preferably compound i) of the formula (I) as component I with hexaflumuron as component II are especially preferred.

Mixtures of the carboxamide compound I, preferably compound i) of the formula (I) as component I with novaluron as component II are especially preferred.

Mixtures of the carboxamide compound I, preferably compound i) of the formula (I) as component I with noviflumuron as component II are especially preferred.

Mixtures of the carboxamide compound I, preferably compound i) of the formula (I) as component I with teflubenzuron as component II are especially preferred.

Mixtures of the carboxamide compound I, preferably compound i) of the formula (I) as component I with triflumuron as component II are especially preferred.

With regard to the use in a pesticidal mixture of the present invention, in an embodiment of the invention, the compound II is selected from group of mitochondrial complex III electron inhibitors.

Mixtures of the carboxamide compound I, preferably compound i) of the formula (I) as component I with hydramethylnon as component II are especially preferred.

With regard to the use in a pesticidal mixture of the present invention, in an embodiment of the invention, the compound II is selected from group of Voltage-dependent sodium channel blockers) and is preferably metaflumizone or indoxacarb.

Mixtures of the carboxamide compound I, preferably compound i) of the formula (I) as component I with metaflumizone as component II are especially preferred.

Mixtures of the carboxamide compound I, preferably compound i) of the formula (I) as component I with indoxacarb as component II are especially preferred.

With regard to the use in a pesticidal mixture of the present invention, in an embodiment of the invention, the compound II is selected from group of Inhibitors of the of acetyl CoA carboxylase, and is preferably a Tetronic or Tetramic acid derivative such as spiromesifen or spirotetramat.

Mixtures of the carboxamide compound I, preferably compound i) of the formula (I) as component I with spiromesifen as component II are also preferred.

Mixtures of the carboxamide compound I, preferably compound i) of the formula (I) as component I with spirotetramat as component II are also preferred.

With regard to the use in a pesticidal mixture of the present invention, in an embodiment of the invention, the compound II is selected from group of Mitochondrial complex II electron transport inhibitors, such as beta-ketonitrile derivatives Mixtures of the carboxamide compound I, preferably compound i) of the formula (I) as component I with cyflumetofen as component II are also preferred.

With regard to the use in a pesticidal mixture of the present invention, in an embodiment of the invention, the compound II is selected from group of Ryanodine receptor-modulators and is preferably chlorantraniliprole, cyclaniliprole, tetraniliprole or cyantraniliprole.

With regard to the use in a pesticidal mixture of the present invention, in another embodiment of the invention, the compound II selected from group of Ryanodine receptor-modulators may also be selected from a compound listed above and coded as M.28.5a) to M.28.5h), namely M.28.5a) N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide; M.28.5b) N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; M.28.5c) N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide; M.28.5d) N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide; or M.28.5h) N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide;

Mixtures of the carboxamide compound I, preferably compound i) of the formula (I) as component I with chlorantraniliprole as component II are especially preferred.

Mixtures of the carboxamide compound I, preferably compound i) of the formula (I) as component I with cyantraniliprole as component II are especially preferred.

Mixtures of the carboxamide compound I, preferably compound i) of the formula (I) as component I with cyclaniliprole as component II are especially preferred Mixtures of the carboxamide compound I, preferably compound i) of the formula (I) as component I with tetraniliprole as component II are especially preferred.

Mixtures of the carboxamide compound I, preferably compound i) of the formula (I) as component I with N-[4,6-dichloro-2-[(diethyl-lambda-4-sulfanylidene)-carbamoyl]-phenyl]-2-(3-chloro-2-pyridyl)-5-(trifluoromethyl)pyrazole-3-carboxamide as component II are especially preferred.

Mixtures of the carboxamide compound I, preferably compound i) of the formula (I) as component I with N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide as component II are especially preferred.

Mixtures of the carboxamide compound I, preferably compound i) of the formula (I) as component I with N-[4-chloro-2-[(di-2-propyl-lambda-4-sulfanylidene)carbamoyl]-6-methyl-phenyl]-2-(3-chloro-2-pyridyl)-5-(trifluoro¬methyl)pyrazole-3-carboxamide as component II are especially preferred.

Mixtures of the carboxamide compound I, preferably compound i) of the formula (I) as component I with N-[4,6-dichloro-2-[(di-2-propyl-lambda-4-sulfanylidene)carbamoyl]-phenyl]-2-(3-chloro-2-pyridyl)-5-(trifluoro-methyl)pyrazole-3-carboxamide as component II are especially preferred.

With regard to the use in a pesticidal mixture of the present invention, in another embodiment of the invention, the compound II may also be selected from group of compounds having an unknown or an uncertain mode of action, such as the following compounds afidopyropen, azadirachtin, piperonly butoxide or sulfoxaflor.

Mixtures of the carboxamide compound I, preferably compound i) of the formula (I) as component I with sulfoxaflor as compound II are also preferred.

Mixtures of the carboxamide compound I, preferably compound i) of the formula (I) as component I with afidopyropen as compound II are also preferred.

Mixtures of the carboxamide compound I, preferably compound i) of the formula (I) as component I with azadirachtin as compound II are also preferred.

Mixtures of the carboxamide compound I, preferably compound i) of the formula (I) as component I with piperonly butoxide as compound II are also preferred.

Further mixtures according to this invention are mixtures of compound ii) of formula (Ia) as component I with the aforementioned compounds II.

Further mixtures according to this invention are mixtures of compound i) of formula (I), compound ii) of formula (Ia) as component I with the aforementioned compounds II.

The compounds I and the one or more compound(s) II are usually applied in a weight ratio of from 5000:1 to 1:5000, preferably from 1000:1 to 1:1000, preferably from 625:1 to 1:625, preferably 500:1 to 1:100, preferably from 100:1 to 1:100 preferably from 20:1 to 1:50, preferably from 20:1 to 1:20, preferably from 10:1 to 1:10, in particular from 5:1 to 1:20, in particular from 5:1 to 1:10, in particular from 5:1 to 1:5.

Depending on the desired effect, the application rates of the mixtures according to the invention are from 5 g/ha to 2000 g/ha, preferably from 0.5 g/ha to 1000 g/ha, preferably from 1 to 750 g/ha, in particular from 5 to 500 g/ha.

The mixtures, as described above for the methods and uses of the invention, may optionally comprise more than one compound II as combination partner. The mixture may comprise, apart from the compound I, preferably compound i) of formula (I), one active compound II (binary mixture), two active compounds II (ternary mixture), three active compounds II (4-way mixture), four active compounds II (5-way mixture).

All explanations and preferences as described for the methods and uses for the compound I, preferably compound i) of formula (I), also apply for the methods and uses wherein a mixture is used, e.g. the explanations and preferences regarding pests to be controlled, formulations or applications.

Applications

In the methods and uses according to the invention, the application of the carboxamide compound I, preferably compound i) of formula (I), of the present invention is preferably as explained in the following.

The animal pest (also referred to as "invertebrate pest"), i.e. the insects, arachnids and nematodes, can be contacted with the present compound I, preferably compound i) of formula (I), or composition(s) comprising it by any application method known in the art for non-crop pest control. As such, "contacting" includes both direct contact (applying the compounds/compositions directly on the animal pest and indirect contact (applying the compounds/compositions to the locus of the animal pest).

The compounds of the present invention are employed as such or in form of compositions by treating the insects surfaces, materials or rooms to be protected from insecticidal attack with an insecticidally effective amount of the active compounds. The application can be carried out both before and after the infection of the surfaces, materials or rooms by the insects.

The present invention also includes a method of combating animal pests which comprises contacting the animal pests, their habitat, breeding ground, food supply, area, material or environment in which the animal pests are growing or may grow, or the materials, surfaces or spaces to be protected from animal attack or infestation with a pesticidally effective amount of a mixture of at least one active compound I, preferably compound i) of formula (I).

Moreover, animal pests may be controlled by contacting the target pest, its food supply, habitat, breeding ground or its locus with a pesticidally effective amount of compounds I, preferably compound i) of formula (I). As such, the application may be carried out before or after the infection of the locus by the pest.

The compounds of the invention can also be applied preventively to places at which occurrence of the pests is expected.

"Locus" means a habitat, breeding ground, area, material or environment in which a pest or parasite is growing or may grow.

Preferably, in the methods according to the present invention, the non-crop pests are controlled or combated by professional treatment in private households and public premises, such as in rural, urban, commercial, industrial and governmental areas, e.g. in and around farm premises and animal housing.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary for the various compounds/compositions used in the invention. A pesticidally effective amount of the compositions will also vary according to the prevailing conditions such as desired pesticidal effect and duration, environment conditions (e.g. climate, temperature), target species, locus, mode of application, and the like.

In the case of soil treatment or of application to the pests dwelling place or nest, the quantity of active ingredient ranges from 0.0001 to 500 g per 100 $m^2$, preferably from 0.001 to 20 g per 100 $m^2$.

Customary application rates in the protection of materials are, for example, from 0.01 g to 1000 g of active compound per $m^2$ treated material, desirably from 0.1 g to 50 g per $m^2$.

Insecticidal compositions for use in the impregnation of materials typically contain from 0.001 to 95 weight %, preferably from 0.1 to 45 weight %, and more preferably from 1 to 25 weight % of at least one repellent and/or insecticide.

The compounds I, preferably compound i) of formula (I), are effective through both contact (via glass, wall, carpet, plant parts or animal parts), and ingestion (bait, or plant part).

For use against non-crop pests as described above, compounds I, preferably compound i) of formula (I), are preferably used in a bait composition.

The bait can be a liquid, a solid or a semisolid preparation (e.g. a gel). Solid baits can be formed into various shapes and forms suitable to the respective application e.g. granules, blocks, sticks, disks. Liquid baits can be filled into various devices to ensure proper application, e.g. open containers, spray devices, droplet sources, or evaporation sources. Gels can be based on aqueous or oily matrices and can be formulated to particular necessities in terms of stickyness, moisture retention or aging characteristics.

The bait employed in the composition is a product, which is sufficiently attractive to incite insects such as ants, termites, wasps, flies, crickets, bed bugs or cockroaches etc. to eat it. The attractiveness can be manipulated by using feeding stimulants or sex pheromones. Food stimulants are chosen, for example, but not exclusively, from animal and/or plant proteins (meat-, fish- or blood meal, insect parts, egg yolk), from fats and oils of animal and/or plant origin, or mono-, oligo- or polyorganosaccharides, especially from sucrose, lactose, fructose, dextrose, glucose, starch, pectin or even molasses or honey. Fresh or decaying parts of fruits, crops, plants, animals, insects or specific parts thereof can also serve as a feeding stimulant. Sex pheromones are known to be more insect specific. Specific pheromones are described in the literature and are known to those skilled in the art.

The bait may comprise further additives, such as vegetable flour, flavoring agents, polymeric binders, proteins, anti-oxidizing agents, preservatives.

The bait may further comprise vegetable flour, which is obtainable by milling of grains or cereals from wheat, barley, rye, oats, rice, sorghum, soybeans, corn, garbanzo or amaranth. Examples of the flavoring agent are cheese flavor, butter flavor, peanut flavor, peach flavor, strawberry flavor, milk flavor.

Suitable polymeric binders are polyvinylpyrrolidone and polysaccharides. Preferred polysaccharides are cellulose derivatives, selected from cellulose esters, such as cellulose acetate or cellulose butyrate, and cellulose ethers, such as carboxymethyl cellulose, methyl cellulose, methylhydroxyalkyl cellulose, hydroxyethyl cellulose, carboxymethyl hydroxyethy cellulose, ethyl cellulose, ethyl hydroxyethyl cellulose, hydroxypropyl cellulose.

Examples of proteins are milk proteins (such as casein, sodium casein, calcium casein, lac-talbumin, dried milk), plant protein (such as gluten, e.g. from wheat; soy extract, peanut extract, zein), animal protein (such as fish meal, meat meal, egg white, liver powder (e.g. from chicken liver or poultry liver), collagen, dried insects, such as crickets) or yeast. Typically, the protein has a crude protein content of at least 20 wt %, preferably at least 35 wt %, and most preferably at least 50 wt % based on dry matter of the protein.

Examples of the anti-oxidizing agent are erythorbic acid, sodium erythorbate, di-tert-butyl hydroxytoluene (BHT), dl-alpha-tocophelol, nordihydroguaiaretic acid, methylhydroxyanisole, propyl gallate, guaiac resin, L-cysteine hydrochloride.

Examples of the preservative are benzoic acid, sodium benzoate, salicylic acid, diphenyl, sorbic acid, potassium sorbate, dehydroacetic acid, sodium dehydroacetate, isobutyl p-oxybenzoate, isopropyl p-oxybenzoate, ethyl p-oxybenzoate, butyl p-oxybenzoate, propyl p-oxybenzoate, calcium propionate, sodium propionate, 2-methyl-4-isothiazolin-3-one (MIT), 1,2-benzisothiazolin-3-one (BIT).

For use in bait compositions, the typical content of active ingredient is from 0.001 weight % to 15 weight %, desirably from 0.001 weight % to 5% weight % of active compound.

In a preferred embodiment of the invention, in the methods and uses according to the invention, the compound I, preferably compound i) of formula (I), is present in the formulation form of an aerosol.

Formulations of compounds I, preferably compound i) of formula (I), as aerosols (e.g. in spray cans), oil sprays or pump sprays are highly suitable for the professional user for controlling pests such as flies or cockroaches. Aerosol recipes are preferably composed of the active compound, solvents such as lower alcohols (e.g. methanol, ethanol, propanol, butanol), ketones (e.g. acetone, methyl ethyl ketone), paraffin hydrocarbons (e.g. kerosenes) having boiling ranges of approximately 50 to 250° C., dimethylformamide, N-methylpyrrolidone, dimethyl sulfoxide, aromatic hydrocarbons such as toluene, xylene, water, furthermore auxiliaries such as emulsifiers such as sorbitol monooleate, oleyl ethoxylate having 3-7 mol of ethylene oxide, fatty alcohol ethoxylate, perfume oils such as ethereal oils, esters of medium fatty acids with lower alcohols, aromatic carbonyl compounds, if appropriate stabilizers such as sodium benzoate, amphoteric surfactants, lower epoxides, triethyl orthoformate and, if required, propellants such as propane, butane, nitrogen, compressed air, dimethyl ether, carbon dioxide, nitrous oxide, or mixtures of these gases.

The oil spray formulations differ from the aerosol recipes in that no propellants are used. For use in spray compositions, the content of active ingredient is from 0.001 to 80 weights %, preferably from 0.01 to 50 weight % and most preferably from 0.01 to 15 weight %.

The compounds I, preferably compound i) of formula (I) and its respective compositions can also be used in fumigating coils, smoke cartridges, vaporizer plates or long-term vaporizers and also in moth papers, moth pads or other heat-independent vaporizer systems.

Insecticidal compositions for application to fibers, fabric, knitgoods, nonwovens, netting material or foils and tarpaulins preferably comprise a mixture including the insecticide, optionally a repellent and at least one binder. Suitable repellents for example are N,N-Diethyl-meta-toluamide (DEET), N,N-diethylphenylacetamide (DEPA), 1-(3-cyclohexan-1-yl-carbonyl)-2-methylpiperine, (2-hydroxymethyl-cyclohexyl) acetic acid lactone, 2-ethyl-1,3-hexandiol, indalone, Methylneodecanamide (MNDA), a pyrethroid not used for insect control such as {(+/−)-3-allyl-2-methyl-4-oxocyclopent-2-(+)-enyl-(+)-trans-chrysantemate (Esbiothrin), a repellent derived from or identical with plant extracts like limonene, eugenol, (+)-Eucamalol (1), (−)-1-epi-eucamalol or crude plant extracts from plants like *Eucalyptus maculata, Vitex rotundifolia, Cymbopogan martinii, Cymbopogan citratus* (lemon grass), *Cymopogan nartdus* (citronella). Suitable binders are selected for example from polymers and copolymers of vinyl esters of aliphatic acids (such as such as vinyl acetate and vinyl versatate), acrylic and methacrylic esters of alcohols, such as butyl acrylate, 2-ethylhexylacrylate, and methyl acrylate, mono- and di-ethylenically unsaturated hydrocarbons, such as styrene, and aliphatic diens, such as butadiene.

The impregnation of nets is done in general by dipping the textile material into emulsions or dispersions of the insecticide or spraying them onto the nets.

The compounds I, preferably compound i) of formula (I), and its compositions can be used for protecting wooden materials such as trees, board fences, sleepers, etc. and buildings such as houses, outhouses, factories, but also construction materials, furniture, leathers, fibers, vinyl articles, electric wires and cables etc. from ants and/or termites (e.g. when the pests invade into houses and public facilities). The compounds I, preferably compound i) of formula (I), are applied not only to the surrounding soil surface or into the under-floor soil in order to protect wooden materials but it can also be applied to lumbered articles such as surfaces of the under-floor concrete, alcove posts, beams, plywoods, furniture, etc., wooden articles such as particle boards, half boards, etc. and vinyl articles such as coated electric wires, vinyl sheets, heat insulating material such as styrene foams, etc. In case of application against ants, the ant controller of the present invention is applied to the crops or the surrounding soil, or is directly applied to the nest of ants or the like.

EXAMPLES

The present invention is now illustrated in further detail by the following examples.

B. Biological Examples

As described further above, the compound I, preferably compound i) of formula (I), of the present invention shows surprisingly syngergistic effects with regard to biological activity and efficacy against non-crop pests.

Synergism can be described as an interaction where the combined effect of two or more compounds is greater than the sum of the individual effects of each of the compounds. The presence of a synergistic effect in terms of percent control, between two mixing partners (X and Y) can be calculated using the Colby equation (Colby, S. R., 1967, Calculating Synergistic and Antagonistic Responses in Herbicide Combinations, *Weeds*, 15, 20-22):

$$E = X + Y - \frac{XY}{100}$$

When the observed combined control effect is greater than the expected combined control effect (E), then the combined effect is synergistic.

The following tests demonstrate the control efficacy of the compound i) of formula (I) alone, and its synergistic activity in mixtures (meaning in combination with other pesticidal actives) on specific pests.

However, the pest control protection afforded by the compounds, mixtures or compositions is not limited to these species. In certain instances, combinations of a compound of this invention with other invertebrate pest control compounds or agents are found to exhibit synergistic effects against certain important invertebrate pests.

The analysis of synergism or antagonism between the mixtures or compositions was determined using Colby's equation.

Biological Examples of the Invention

Test 1. Activity Against German Cockroach (*Blattella germanica*)

Glass vials were treated with 445 µl of varying concentrations of the technical grade active ingredient dissolved in acetone. Vials were turned on their sides and placed on an automated roller table. The vials were rolled (6 rpm) uncapped to allow an even coating of the treatment. Each treatment was replicated five times.

Prior to infestation, cockroaches were incapacitated using carbon dioxide ($CO_2$). Approximately 6 insects were transferred with featherweight, broad tip forceps into treated vials, and held in an environmental chamber at 27° C. and 80% relative humidity for one hour. Following this exposure period, a small amount of $CO_2$ was used to incapacitate the insects facilitating removal from treated vials. Insects were then transferred to 16 oz plastic holding containers provisioned with a small piece of dry cat food and a cotton wick moistened with water, and returned to the environmental chamber. Mortality was assessed at 1, 2, and 3 days after exposure (DAE).

TABLE 1

Results of test 1 (Activity against German Cockroach (*Blattella germanica*))

| German Cockroach | ppm | Average Control % |
|---|---|---|
| Mixture 1.1 | | |
| Compound i) of formula (I) | 9.2 | 10 |
| Dinotefuran | 2.6 | 16.7 |
| Dinotefuran + Compound i) of formula (I) | 2.6 + 9.2 | 53.3* |
| Test Mixture 1.2 | | |
| Compound i) of formula (I) | 10 | 10 |
| Dinotefuran | 4.1 | 30 |
| Dinotefuran + Compound i) of formula (I) | 4.1 + 10 | 86.7* |
| Test Mixture 1.3 | | |
| Compound i) of formula (I) | 9.5 | 26.7 |
| Chlorfenapyr | 100 | 3.3 |
| Chlorfenapyr + Compound i) of formula (I) | 100 + 9.5 | 43.3* |
| Test Mixture 1.4 | | |
| Compound i) of formula (I) | 9.5 | 46.7 |
| Alphacypermethrin | 1.96 | 0 |
| Alphacypermethrin + Compound i) of formula (I) | 1.96 + 9.5 | 63.3* |

*synergistic control effect according to Colby's equation

Following further test systems may used to evaluate the efficacy of the compound i) of formula (I) against non-crop pests.

2. For Evaluating Activity Against Argentine Ant, Acrobat Ant, Carpenter Ant, Fire Ant, and Eastern Subterranean Termite Via Soil Contact For ants, tests are conducted in Petri dishes. A thin layer of 1 percent agar in water is dispensed into the dishes and Florida sandy soil is spread over the agar (5 g for the small dishes and 11 g for the larger dishes). The active ingredient is dissolved in acetone' and dispensed over the sand. Dishes are vented to evaporate the acetone, infested with ants, and covered. A 20% honey water solution is placed in each dish. The dishes are maintained at 22° C. and observed for mortality at various time intervals.

For termites, a thin layer of 1% agar is dispensed into Petri dishes. A thin layer of pre-treated soil is spread over the agar. For soil treatment, the active ingredient is diluted in acetone on a weight-to-weight basis and incorporated into 100 g of soil. The soil is placed in a jar and vented for 48 hours. The moisture level of the soil is brought to field capacity by adding 7 ml of water. Termite workers are introduced into each dish. A small piece of filter paper is placed into each dish after 1 day as a food source, and additional water is added as needed to maintain soil moisture. Test dishes are held at a dark incubator at 25° C. and appr. 80% relative humidity.

Termites are observed daily for mortality (dead or unable to stand upright and showing only weak movement).

3. For Evaluating Activity Against Argentine Ant, Acrobat Ant, Carpenter Ant, Fire Ant, House Fly, Eastern Subterranean Termite, Formosan Subterranean Termite and German Cockroach Via Bait For Argentine ant, acrobat ant, and carpenter ant, tests are conducted in Petri dishes. Ants are given a water source, and then are starved of a food source for 24 hours. Baits are prepared with either 20% honey/water solutions or ground cat chow. Active ingredient in acetone is added to the bait. 0.2 ml of treated honey water solution or 150 mg of treated cat chow, placed in a cap, is added to each dish. The dishes are covered and maintained at a temperature of 22° C. The ants are observed for mortality daily.

For the fire ants, corn grit is used as a bait matrix. Corn grit bait is prepared using a mixture of defatted corn grit (80%), soybean oil (19.9%), acetone, and the active ingredient (0.1%). Petri dishes are supplied with a water source. Fire ant adults are placed into each dish. The next day, 250 mg of bait in bait containers is placed into the dishes. The ants are observed for mortality daily.

For house flies. Bait tests are conducted with adults aged 2-5 days post-emergence. Active ingredient in acetone is applied to a bait matrix consisting of a 1:1 mixture of powdered milk and sugar which was then allowed to dry. Assays are conducted in jars with 250 mg of bait in a pan placed in the bottom of each jar. House flies are placed into the bait jars which are covered. The test jars are held at 22° C. Test jars are observed at 4 hours after treatment for knockdown (death plus morbidity (unable to stay upright).

For termites, active ingredient in acetone is applied to filter papers. % a.i. are calculated on basis of the weight of the filter paper. Acetone only is applied for untreated controls. Treated papers are vented to evaporate the acetone, moistened with ml water, and placed Petri dishes with sand. Water is added during the test as needed. Bioassays are conducted with one treated filter and ca. 30 termite workers per test dish. Test dishes are maintained at 25° C. and appr. 85% relative humidity and observed daily for mortality (dead or moribund insects) or intoxication. Dead or moribund insects are removed daily.

For cockroaches, plastic roach boxes with ventilated lids are used as test arenas. The top 3-4 cm of the arenas are treated with Vaseline and mineral oil to prevent roaches from escaping. Water is provided as needed. The bait is prepared using ground cat chow, and the active ingredient in acetone is incorporated on a weight-to-weight ratio. The treated chow is allowed to dry. The cockroaches are placed in the boxes and starved for 24 hours prior to bait introduction. 0.03 grams of bait per box are placed in a weigh boat. The boxes are maintained at 22° C. and observed daily for mortality of the cockroaches.

The invention claimed is:

1. A method for controlling or combating a population of non-crop pests, the method comprising contacting the non-crop pests or their food supply, habitat, breeding grounds or their locus with a composition comprising a pesticidally active carboxamide compound I

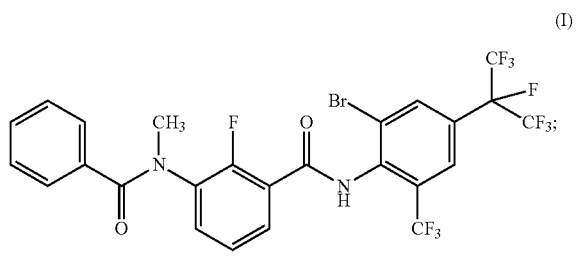 [SMILES: CN(C(=O)c1ccccc1)c1cccc(C(=O)Nc2c(Br)cc(C(F)(C(F)(F)F)C(F)(F)F)cc2C(F)(F)F)c1F]

and
at least one other insecticidal active ingredient selected from the group consisting of alpha-cypermethrin, chlorfenapyr, and dinotefuran,
wherein the pesticidally active carboxamide compound I and the at least one other insecticidal active ingredient are present in the composition in a weight ratio of from 5:1 to 1:11.

2. The method according to claim 1, wherein the non-crop pest is selected from an order of Dipterea.

3. The method according to claim 1, wherein the non-crop pest is selected from an order of Blattodea.

4. The method according to claim 1, wherein the non-crop pest is selected from an order of Isoptera.

5. The method according to claim 1, wherein the non-crop pest is selected from an order of Hymenoptera.

6. The method according to claim 1, wherein the non-crop pest is selected from an order of Orthoptera.

7. The method according to claim 1, wherein the non-crop pest is selected from an order of Hemiptera.

8. The method according to claim 1, wherein the method further comprises protecting a stored product from non-crop pests.

9. The method according to claim 8, wherein the stored product is selected from tobacco, nuts, cocoa, fruits, wood.

10. The method according to claim 8, wherein the stored product is protected by a netting or textile material impregnated with the composition as defined in claim 1.

11. A method for controlling or combating a population of social insects, or for preventing an infestation of a locus by social insects, the method comprising contacting the social insects or their food supply, habitat, breeding grounds or their locus with the composition as defined in claim 1.

12. The method according to claim 11, wherein the locus is contacted with the composition in form of a spray, a foam, an aerosole, a bait or granulate.

13. The method according to claim 1, wherein the non-crop pest is selected from the group consisting of flies, cockroaches, termites, ants, wasps, crickets, grasshoppers, locusts, and bed bugs.

14. The method according to claim 1 wherein the composition is a bait composition.

15. The method according to claim 1, wherein the non-crop pest is a termite selected from the group consisting of *Calotermes flavicollis, Leucotermes flavipes, Heterotermes aureus, Reticulitermes flavipes, Reticulitermes virginicus, Reticulitermes lucifugus, Termes natalensis*, and *Coptotermes formosanus*.

16. The method according to claim 1, wherein the non-crop pest is an ant selected from the group consisting of *Crematogaster* spp., *Hoplocampa minuta, Hoplocampa testudinea, Monomorium pharaonis, Solenopsis geminata, Solenopsis invicta, Solenopsis richteri, Solenopsis xyloni, Pogonomyrmex barbatus, Pogonomyrmex californicus, Dasymutilla occidentalis*, Bornbus spp. *Vespula squamo-sa, Paravespula vulgaris, Paravespula pennsylvanica, Paravespula germanica, Dolicho-vespula maculate, Vespa crabro, Polistes rubiginosa, Camponotus floridanus*, and *Linepithema humile*.

17. The method according to claim 1, wherein the non-crop pest is a cockroach selected from the group consisting of *Blattella germanica, Blattella asahinae, Periplaneta americana, Periplaneta japonica, Peri-planeta brunnea, Periplaneta fuligginosa, Periplaneta australasiae, Blatta orientails*, and *Supella longipalpa*.

18. The method according to claim 1, wherein the at least one other insecticidal active ingredient is alpha-cypermethrin.

19. The method according to claim 1, wherein the at least one other insecticidal active ingredient is chlorfenapyr.

20. The method according to claim 1, wherein the at least one other insecticidal active ingredient is dinotefuran.

21. The method according to claim 1, wherein the method results in a destruction of more than 60% of a population of the non-crop pests.

22. The method according to claim 1, wherein the method results in a destruction of 95 to 100% of a population of the non-crop pests.

23. The method according to claim 1, wherein the method comprises contacting a minor fraction of the population of the non-crop pests or their food supply, habitat, breeding grounds or their locus with the composition as defined claim 1.

24. The method according to claim 23, wherein the minor fraction of the population is between 1 and 50 percent of the total population.

25. The method according to claim 23, wherein the minor fraction of the population is between 2 and 20 percent of the total population.

26. The method according to claim 1, wherein the pesticidally active carboxamide compound I and the at least one other insecticidal active ingredient are present in the composition in a weight ratio of from 5:1 to 1:10.

* * * * *